US011858687B2

(12) United States Patent
Barabeisch et al.

(10) Patent No.: US 11,858,687 B2
(45) Date of Patent: Jan. 2, 2024

(54) STORAGE DEVICE

(71) Applicant: TANOS GmbH, Illertissen (DE)

(72) Inventors: Markus Barabeisch, Vöhringen (DE); Patrick Schmittmann, Giengen (DE); Edwin Bunnik, Ulm (DE)

(73) Assignee: TANOS GmbH, Illertissen (DE)

( * ) Notice: Subject to any disclaimer, the term of this patent is extended or adjusted under 35 U.S.C. 154(b) by 247 days.

(21) Appl. No.: 17/275,493

(22) PCT Filed: Sep. 14, 2018

(86) PCT No.: PCT/EP2018/074903
§ 371 (c)(1),
(2) Date: Mar. 11, 2021

(87) PCT Pub. No.: WO2020/052777
PCT Pub. Date: Mar. 19, 2020

(65) Prior Publication Data
US 2022/0033140 A1 Feb. 3, 2022

(51) Int. Cl.
*B65D 21/02* (2006.01)
*B25H 3/02* (2006.01)
*B65D 25/28* (2006.01)

(52) U.S. Cl.
CPC ............ *B65D 21/023* (2013.01); *B25H 3/02* (2013.01); *B65D 25/2841* (2013.01); *B65D 25/2858* (2013.01)

(58) Field of Classification Search
CPC ............ B65D 21/0228; B65D 21/0224; B65D 21/0222; B62B 3/02; B25H 3/021; B25H 3/02
USPC .......................................................... 206/503
See application file for complete search history.

(56) References Cited

U.S. PATENT DOCUMENTS 4,351,448 A * 9/1982 Ingersoll ................ A45C 13/28
206/508
5,603,559 A 2/1997 Yemini
5,671,856 A * 9/1997 Lisch ........................ B25H 3/06
220/4.27
D385,722 S * 11/1997 Yemini ........................ D6/671.1
6,874,634 B2 * 4/2005 Riley ...................... A61B 50/30
206/439
6,889,838 B2 * 5/2005 Meier .................... B25H 3/021
206/508

(Continued)

FOREIGN PATENT DOCUMENTS

DE 19706413 A1 8/1998
DE 102004005362 A1 8/2005

(Continued)

*Primary Examiner* — Ernesto A Grano
(74) *Attorney, Agent, or Firm* — Hoffmann & Baron, LLP

(57) ABSTRACT

A storage device which has a plurality of storage containers, which include at least one first storage container and at least one second storage container. The container housings have, on the outer faces thereof, an identical, uniform housing fastening interface, to which a first handle is attached in order to form a first storage container, and to which a second handle is attached in order to form a second storage container. The first handle is a pivotable carrying handle, around which a hand can grip. The second handle is designed as a pull handle which cannot be gripped, which has a grip strip behind which the fingers of a hand can grip.

23 Claims, 13 Drawing Sheets

(56) References Cited

U.S. PATENT DOCUMENTS

| | | | | | |
|---|---|---|---|---|---|
| 7,219,969 | B2 * | 5/2007 | Bezzubov | A47B 87/0276 | 312/107 |
| 7,494,011 | B2 * | 2/2009 | Henssler | B25H 3/02 | 220/772 |
| D627,967 | S * | 11/2010 | Kuhls | D3/273 | |
| 8,061,492 | B2 * | 11/2011 | Riedel | B25H 3/02 | 220/756 |
| 8,459,495 | B2 * | 6/2013 | Koenig | B65D 25/2858 | 220/761 |
| 8,590,704 | B2 * | 11/2013 | Koenig | B65D 21/0228 | 206/508 |
| 8,602,217 | B2 * | 12/2013 | Sosnovsky | B65D 21/0228 | 220/756 |
| 8,657,307 | B2 * | 2/2014 | Lifshitz | B25H 3/02 | 280/47.17 |
| 8,813,960 | B2 * | 8/2014 | Fjelland | F16B 45/02 | 220/4.27 |
| 9,187,210 | B2 * | 11/2015 | Zhu | E05C 19/14 | |
| 9,193,060 | B2 * | 11/2015 | Ben-Gigi | B65D 25/2867 | |
| D803,561 | S * | 11/2017 | Kuhls | D3/905 | |
| 9,850,029 | B2 * | 12/2017 | Brunner | B25H 3/023 | |
| 10,405,626 | B2 * | 9/2019 | Gonitianer | E05B 1/0084 | |
| 2003/0094392 | A1 * | 5/2003 | Meier | B65D 21/0213 | 206/503 |
| 2009/0236255 | A1 * | 9/2009 | Piacenza | B65D 45/22 | 206/508 |
| 2009/0257192 | A1 * | 10/2009 | Li | F04D 29/601 | 361/695 |
| 2011/0049824 | A1 * | 3/2011 | Bar-Erez | B25H 3/028 | 280/47.26 |
| 2011/0168599 | A1 * | 7/2011 | Koenig | B65D 45/20 | 206/509 |
| 2011/0233096 | A1 * | 9/2011 | Michels | B65D 25/205 | 206/459.5 |
| 2012/0326406 | A1 * | 12/2012 | Lifshitz | B25H 3/02 | 206/503 |
| 2015/0151427 | A1 * | 6/2015 | Ben-Gigi | B65D 21/0228 | 220/4.27 |
| 2015/0274362 | A1 * | 10/2015 | Christopher | B65D 21/0219 | 206/506 |
| 2016/0144500 | A1 * | 5/2016 | Chen | B65D 21/023 | 206/349 |
| 2017/0318927 | A1 * | 11/2017 | Kraus | A45C 5/00 | |
| 2018/0044059 | A1 * | 2/2018 | Brunner | B65D 21/0228 | |
| 2018/0161975 | A1 * | 6/2018 | Brunner | B25H 3/028 | |

FOREIGN PATENT DOCUMENTS

| | | | |
|---|---|---|---|
| DE | 102011006871 | A1 | 7/2012 |
| DE | 202012102760 | U1 | 12/2012 |
| DE | 202016005078 | U1 | 9/2016 |
| EP | 2226163 | A2 | 9/2010 |
| EP | 2485874 | A1 | 8/2012 |
| EP | 3332921 | A1 | 6/2018 |
| WO | 2011/131213 | A1 | 10/2011 |

* cited by examiner

STORAGE DEVICE

This application claims priority based on an International Application filed under the Patent Cooperation Treaty, PCT/EP2018/074903, filed on Sep. 14, 2018.

BACKGROUND OF THE INVENTION

The invention relates to a storage device with several storage containers, amongst which at least one first storage container and at least one second storage container are located, wherein the at least one first storage container comprises a first container housing, on which a housing fastening interface is formed at the outside, to which housing fastening interface a first handle which is designed as a pivotable carrier grip, around which a hand can engage, is fastened by way of a first grip fastening interface which is formed on it, and wherein the at least one second storage container comprises a second container housing, on which a housing fastening interface is likewise formed at the outside, on which housing fastening interface a second handle is fastened by way of a second grip fastening interface which is formed on it.

A storage device which comprises a storage container which is designed as a hand tool box and in whose container housing a light device is integrated is known from DE 10 2011 006 871 A1. The container housing on a front side has a handle which is designed as a pivotable carrier grip and around which a hand can grip for transporting the storage container. On an upper side, the container housing additionally comprises a further handle which is likewise designed as a carrier grip and with the help of which the storage container can be transported in a different spatial alignment than when using the handle which is attached to the front side.

DE 20 2012 102 760 U1 discloses a container-like transport device which for the user friendly handling is likewise provided with two carrier grips for the alternative horizontal or vertical carrying position.

DE 197 06 413 A1 discloses a suitcase-like receptacle which on an upper side comprises a bow-like upper carrier grip and on whose front side a front carrier grip can additionally be attached in a releasable manner by way of latching connection devices.

A storage device which is known from EP 2 485 874 B1 comprises a storage container whose container housing consists of a box-like housing lower part and of a housing lid which is pivotably mounted thereon in the region of the rear side. The housing lid can be pivoted into a closure position, in which it lies on the housing lower part and closes an access opening for an internal storage space of the container housing. A pivotable upper carrier grip is attached at the outside to the upper side of the housing lid. Furthermore, coupling devices are formed in the region of the upper side and the lower side of the container housing, said coupling devices permitting the stacking of several storage containers on one another and permitting them to be releasably coupled to one another in a manner in which they cannot be lifted from one another.

A shelf-box system which comprises boxes which function as storage containers and which for their mounting can be inserted into a shelf and pulled out when required is known from DE 10 2004 005 362 B4. For handling on pulling out of the shelf, each box on the front side has a handle which is integrally formed in a rigid manner as one piece, said handle being designed a pull grip which is suitable only for pulling the storage container and comprising a grip ledge, behind which the fingers of a hand can grip for applying a pulling force, but around which the hand in its entirety cannot grip.

SUMMARY OF THE INVENTION

It is the object of the invention to take measures in order to be able to manufacture storage containers which can be handled in a different way and manner, in a simple and inexpensive manner.

For achieving this object, the housing fastening interfaces of the first container housing and of the second container housing amongst one another are designed identically as a uniform housing fastening interface, wherein the second handle which is fastened to the uniform housing fastening interface of the second container housing is designed as a pull grip, around which one cannot grip, with a grip ledge, behind which the fingers of a hand can grip.

In this manner, a storage device is present which is composed of a plurality of storage containers, amongst which one or more first storage containers as well as one or more second storage containers are to be found. Each of these storage containers comprises a container housing which concerning the first storage container is denoted as a first container housing and concerning the second storage container is denoted as a second container housing. The first and the second container housing correspond to one another at least to the extent that they have a uniform housing fastening interface which are designed identically amongst one another. The first storage container comprises a first handle which is designed as a pivotable carrier grip and on which a first grip fastening interface is formed, via which first grip fastening interface it is fastened to the uniform housing fastening interface of the first container housing. This pivotable carrier grip can be gripped around by a hand, in order to carry the first storage container in a manner comparable to a suitcase. The second storage container comprises a second handle which is designed as a pull grip and on which a second grip fastening interface is formed, via which second grip fastening interface it is fastened to the uniform housing fastening interface of the second container housing. This pull grip is not conceived for carrying the second storage container and cannot therefore be gripped around by a hand. It purpose is merely to simplify the pulling of the second storage container out of an accommodation device, for example out of a shelf structure, for the purpose of which it is provided with a grip ledge which is shaped in order to be gripped behind by the fingers of a hand for exerting a pulling force. No intermediate space which is suitable for being gripped around by way of a hand is formed between the pull grip and the second container housing. The pull grip in practise merely forms a pull-out aid for the storage container. The uniform housing fastening interface simplifies the manufacture of the first and second storage container since at the point in time of manufacture of a storage housing, one does not yet need to decide whether it is to be provided with a pivotable carrier grip for use as a first container housing or with a pull grip which comprises a grip ledge for use as a second container housing. Inasmuch as the uniform housing fastening interface and the first and the second grip fastening interfaces are designed for the releasable connection, there further exists the advantage that the container housing can be retrofitted from a first container housing into a second container housing or vice versa at a later stage by way of a grip exchange.

Advantageous further developments of the invention result from the dependent claims.

The second handle which is fastened to the uniform housing interface of the second container housing is expediently immovable with respect to the second container housing. Its relative position with respect to the second container housing cannot be changed. Such a second handle can be manufactured in a particularly inexpensive manner. Alternatively, the second handle as a whole or with constituents can be movable relative to the second container housing. In particular, the grip ledge, behind which one can manually grip can be movable relative to the second container housing, for example able to be pushed in or pulled out, so that it can be displaced between a space-saving position of non-use and a position of use.

It has been found to be favourable to design the first grip fastening interface of the first handle, said first handle being designed as a pivotable carrier grip, differently from the second grip fastening interface of the second handle, said second handle being designed as a pull grip. The first and the second grip fastening interfaces however can be coupled to the uniform fastening interface irrespectively of their different design. On manufacture of the two handles, this provides a larger degree of design freedom.

A preferred design envisages the uniform housing fastening interface of the second container housing being completely used by the second grip fastening interface of the second handle, said second handle being designed as a pull grip, whereas concerning the first container housing the uniform housing fastening interface is only partly used by the first grip fastening interface which is attached thereto, of the first handle which is designed as a pivotable carrier grip. In particular, this can manifest itself by way of the constituents of the uniform housing fastening interface which with regard to the second container housing are occupied by the second grip fastening interface, being unoccupied with regard to the first container housing and even not being able to be visible from the outside, at least at certain pivoting positions of the pivotable carrier grip.

The uniform housing fastening interface expediently has a plurality of housing fastening sections, wherein as a whole it is preferably formed from this plurality of housing interface sections. The second grip fastening interface of the second handle is preferably designed such that it is in fastening engagement with all housing fastening sections of the uniform housing fastening interface. In contrast to this, the first grip fastening interface of the first handle is not in fastening engagement with all, but only with some of the housing fastening sections of the uniform housing fastening interface.

In principle, there is of course also the possibility of designing the grip fastening interfaces of the two handles such that they each completely use the uniform housing fastening interface. In this case, it is particularly economical if the first grip fastening interface and the second grip interface are designed identically amongst one another.

Preferably, the uniform housing fastening interface comprises at least one constituent which is to be denoted as a common housing fastening section, as well as at least one further constituent which is distanced with respect to this and which for an improved differentiation is to be denoted as an individual housing fastening section. The first handle as well as the second handle is each fixed on the assigned first and second container housing respectively, at the at least one common housing fastening section of the uniform housing fastening interface. Moreover, it is however only the second handle which is yet additionally also fastened with its second grip fastening interface to the at least one individual housing fastening section of the second container housing.

In order to achieve a particularly stable fastening of the handles to the assigned container housing, it is advantageous if the uniform housing fastening interface comprises precisely two common housing fastening sections and additionally precisely two individual housing fastening sections. These in total four housing fastening sections are preferably placed in the corner regions of an imagined rectangle. Herein, the two common housing fastening sections are arranged adjacently to one another and likewise also the two individual housing fastening sections. If the uniform housing interface is advantageously located on a horizontally orientated front side of the container housing, then the two common housing fastening sections just as the two individual housing fastening sections expediently each lie on a horizontal line. The two common housing fastening sections are herein preferably placed above the two individual housing fastening sections.

The first handle and the second handle are preferably designed such that the first grip fastening interface of the first handle as well as the second grip fastening interface of the second handle each comprises at least one primary grip fastening section, whereas only the second grip fastening interface of the second handle furthermore also yet comprises at least one secondary grip fastening section. The terms “primary” and “secondary” here are used for an improved differentiation of the respective components. The first as well as the second handle is fastened to the at least one common housing fastening section of the uniform housing fastening interface amid the use of its at least one primary grip fastening section. Furthermore, only the second handle is yet additionally also fastened with its at least one secondary grip fastening section to the at least one individual housing fastening section of the uniform housing fastening interface of the second container housing.

The handles can be assembled on the assigned container housing in a particularly simple, quick and reliable manner if each common housing fastening section of the uniform housing fastening interface together with a primary grip fastening section of the first and second grip fastening interface forms a latching connection device. Herewith, the first handle as well as the second handle can be fixed or is fixed on the at least one common housing fastening section of the uniform housing fastening interface of the first and second container housing respectively by way of a latching connection procedure and in particular without the use of tools.

It has been found to be advantageous for the assembly of the second handle which is designed as a pull grip if each secondary grip fastening section which is formed on it, together with an individual housing fastening section of the uniform housing fastening interface forms an insert-pivot connection device. In this manner, the second handle, for assembly on the second container housing, in a first assembly step can be inserted with its at least one secondary grip fastening section into the at least one individual housing fastening section and in a second assembly step which is subsequent to this can be pivoted onto the second container housing about a pivot axis which is defined by the components which are inserted into one another. The second assembly step can end with a latching connection which results from the at least one primary grip fastening section snapping into a common housing fastening section of the uniform housing fastening interface.

This latching connection can be designed in a non-releasable or releasable manner by way of a suitable design of the latching means which cooperate with one another.

It is seen as being particularly advantageous if each common housing fastening section of the uniform housing fastening interface together with a primary grip fastening section of the first grip fastening interface of the first handle forms a pivot bearing device for the first handle which is designed as a pivotable carrier grip. This pivot bearing device expediently defines a pivot axis, about which the carrier grip is pivotable in a manner such that it is selectively positionable in a position of non-use which is pivoted onto the container housing or in a position of use which is pivoted away from the container housing and by way of this projects away from the container housing. For a particularly stable pivoting mounting, it is advantageous if the uniform housing fastening interface and the first grip fastening interface define two pivot bearing devices which are distanced to one another in the axis direction of the pivot axis of the carrier grip.

Each pivot bearing device expediently comprises two bearing components which engage into one another in the axis direction of the pivot axis and are rotatable relative to one another about the pivot axis. Herein, the one bearing component is preferably formed by a common housing fastening section and the other bearing component by a primary grip fastening section. One of the bearing components is preferably designed as a bearing eye and the other as a bearing pin which can be rotatably inserted into the bearing eye.

It is advantageous if an arresting device for the releasable arresting of the position of non-use of the first handle is assigned to this first handle which is designed as a pivotable carrier grip. This prevents the pivotable carrier grip from pivoting relative to the container housing in an uncontrolled manner when the first storage container is transported without the use of the first handle and for example amid the use of an additionally present upper carrier grip which is arranged on the upper side. Herewith, one can prevent the pivotable carrier grip from pivoting to and fro in an uncontrolled manner and hitting the container housing at the outside. Furthermore, by way of this measure one can rule out the pivotable carrier grip being accidentally pivoted out of the position of non-use and possibly due to manufacturing tolerances and on account of friction getting stuck in a position which is pivoted away from the container housing, which on transport of the storage container could result in the first handle hitting another object and becoming damaged.

The arresting device which is assigned to the first handle is expediently designed in a manner such that given a manually created pivoting of the handle it can automatically latch in and latch out with a snap effect depending on the pivoting direction. This results in the arresting and the release of the arresting being effected in a quasi automatic manner when the user of the storage device grips the pivotable carrier grip and by way of a suitable force effort pivots it in the direction of the position of non-use or in the direction of the position of use.

The first handle which is designed as a pivotable carrier grip is expediently designed as a bow grip which is designed at least in an essentially U-shaped manner and which comprises two grip limbs which are connected to one another by a connection web, around which a hand can grip. In each case, a constituent of the first grip fastening interface which is in fastening engagement with the uniform housing fastening interface of the first container housing and concerning which it is particularly one of the already mentioned primary grip fastening sections is located on the free end sections of the grip limbs which are opposite to the connection web.

The second handle which functions as a pull grip is expediently designed in an H-shaped manner and comprises two grip limbs which are parallel to one another and which are rigidly connected to one another by a connection web. The grip ledge behind which the fingers of a hand can grip is herein formed by the connection web.

The first container housing as well as the second container housing each have an upper side which faces in a height direction and a front side which is orientated at right angles to the height direction. It is seen as being particularly advantageous if the first handle and well as the second handle form a front handle which is arranged on the front side of the first and of the second container housing respectively, wherein accordingly the uniform housing fastening interface is also located on this front side.

A particularly comfortable handling of the storage container is possible if the first container housing as well as the second container housing additionally to the front handle which is arranged on the front side comprise an upper carrier grip which is arranged on the upper side at the outside. By way of the use of this upper carrier grip, the assigned storage container can be transported in an alignment, in which its height axis is orientated vertically. Additionally, concerning the first storage container there is the advantageous possibility of alternatively using the first handle which is designed as a pivotable carrier grip and of transporting the storage container in an alignment, in which the height axis is aligned horizontally.

If the first storage container is accommodated in a shelf structure with a vertical height axis, then it can be easily pulled out whilst using the front handle which is designed as a pivotable carrier grip. Once pulled out, the first storage container can be transported by way of the selective use of the front handle or of the upper carrier grip. The second storage container which is accommodated in a shelf structure can likewise be easily pulled out whilst using the front handle which is designed as a pull grip. Its subsequent manual transport however only takes place whilst using the upper carrier grip due to the lack of corresponding suitability of the pull grip.

Furthermore, there is the possibility of only providing one of the first and second storage containers with an upper carrier grip additionally to a front handle. For example, concerning the first storage container, the upper carrier grip can be done away with since the first handle is already conceived as a carrier grip.

In principle, the upper carrier grip can be immovably attached to the assigned container housing. Preferably however, the optional upper carrier grip is pivotably mounted on the first or second container housing and in the course of a pivoting movement can be selectively pivoted into a position of non-use which is pivoted onto the container housing at the top or into a position of use which is pivoted away from the container housing and which projects upwards.

As with the first handle which is conceived as a pivotable carrier grip, an arresting device which is suitable for the releasable arresting of the position of non-use and which is expediently designed a latching device which automatically latches in or latches out on pivoting the upper carrier grip can also be assigned to the upper carrier grip.

Preferably, the first container housing and/or the second container housing are composed of a box-like housing lower part and of a housing lid. The housing lower part on its upper side comprises an access opening for an internal storage space, to which the housing lid is assigned. The housing lid is pivotably mounted on the housing lower part in a manner such that it is selectively pivotable into a closure position which covers the access opening and into at least one opening position which releases the access opening. Objects can be brought into the storage space and be taken out of this again through the released access opening. The housing lower part usefully comprises a base wall and a peripheral wall which projects upwards from the edge of the base wall towards the upper side, wherein the upper end section of the peripheral wall frames the access opening.

Preferably, the container housing is designed such that the housing lid in the closure position is releasably lockable with the housing lower part. Suitable locking means are expediently located on the front side of the container at the outside, in particular above the uniform housing fastening interface. The locking means comprise for example a rotary bar.

At least one first storage container or at least one second storage container can be designed without a lid. This storage container then comprises for example only the housing lower part and has no housing lid which is articulated thereon.

The first container housing and the second container housing as a whole can be designed identically. However, they can also have a design which differs from one another—disregarding the corresponding shaping of the uniform housing fastening interface. In particular, one can envisage the first and the second container housing although having the same outline, having a different height. There is even the possibility of designing several first container housings amongst one another and/or several second container housings amongst one another with a height which differs from one another. In this manner, one can realise a systematically constructed storage container, concerning which each storage container represents a system container.

In an advantageous design, the storage device comprises a shelf structure, in which each storage container can be received in a manner in which it can be pulled out whilst not in use. In this context, it is advantageous if the first container housing as well as the second container housing on its outside comprises a guide device which fits together with a counter guide device which is arranged on the shelf structure and which likewise belongs to the storage device. Preferably, the guide device as well as the counter guide device are structured in a rail-like manner and engage into one another in a linearly displaceable manner, this assisting in a smooth pulling or insertion of a storage container out of and into the shelf structure respectively.

The guide device is expediently integrated as one piece into the container housing which preferably consists of plastic material.

Expediently, the first and second storage containers are designed such that they are stackable onto one another in their height direction. By way of this, they can be stored in a space-saving manner. Furthermore, the storage device can have an arbitrary number of the first storage containers as well as of the second storage containers.

It is furthermore advantageous if each first and second storage container comprises a lower coupling device on its container housing in the region of the lower side and an upper coupling device in the region of the upper side, wherein these two coupling devices are adapted to one another in a manner such that storage containers which are directly stacked onto one another in a height direction can be releasably coupled to one another in a manner in which they cannot be lifted from one another, by way of the interaction of the upper coupling device of the respective lower storage container and of the lower coupling device of the respective upper storage container.

If the storage containers comprise a housing lower part and a housing lid which is pivotable with respect to this, wherein these two components are releasably lockable to one another in a closure position of the housing lid by way of locking means, it is advantageous if the locking means fulfil a multi-function and are also designed as constituents of at least one of the coupling devices.

BRIEF DESCRIPTION OF THE DRAWINGS

The invention is hereinafter explained in more detail by way of the accompanying drawings. In these are shown in.

DETAILED DESCRIPTION

Figure 1:
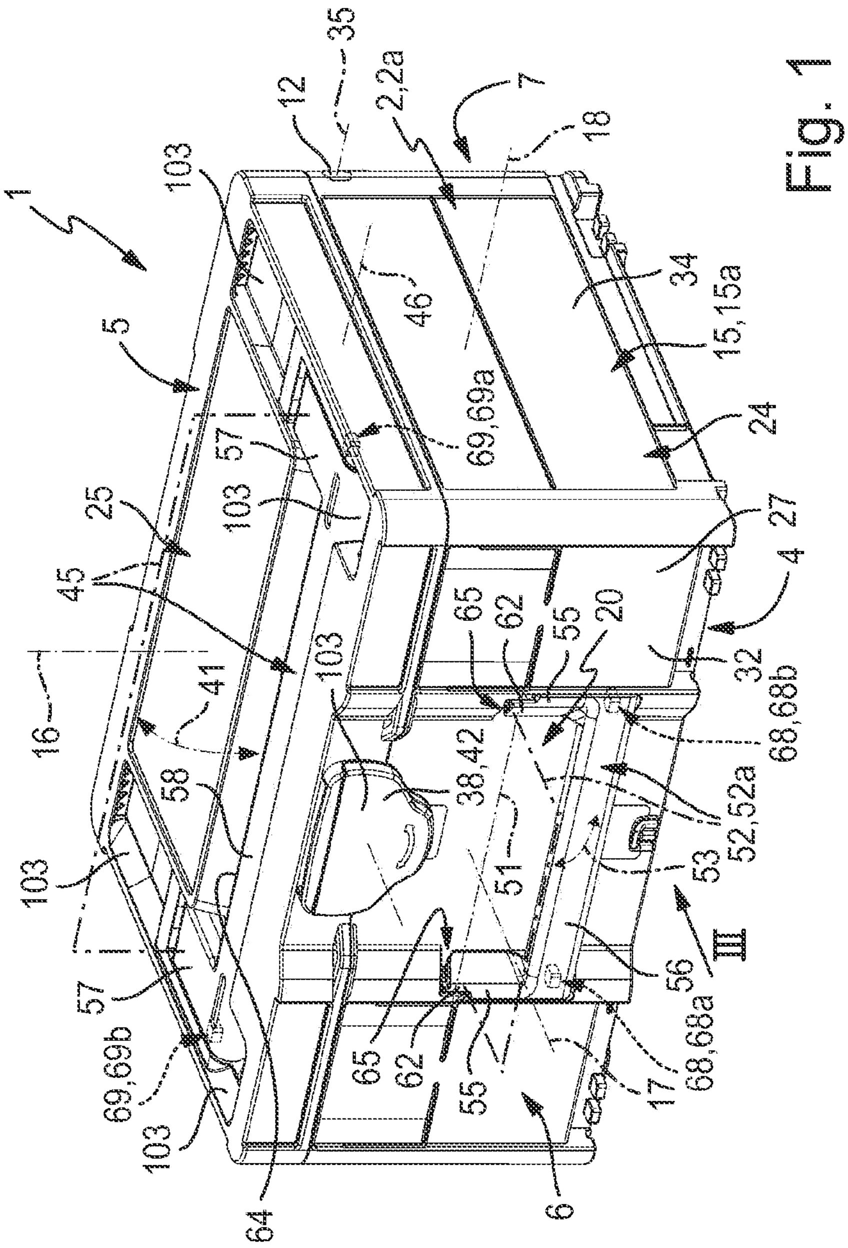
FIG. 1 a perspective representation of a preferred embodiment of a first storage container of the storage device according to the invention, said first storage container comprising a first handle which is designed as a pivotable carrier grip and which as a front handle is attached to a front side of the container housing, wherein a position of non-use of the front handle which is pivoted onto the container housing is shown, FIG. 2 the first storage container of FIG. 1 in the state of its first handle pivoted into a position of use, FIG. 3 a front view of the first storage container of FIGS. 1 and 2 with a viewing direction according to arrow III of FIG. 1, FIG. 4 a section through the first storage container of FIGS. 1 to 3 according to section line IV-IV of FIG. 3, FIG. 5 the detail V which is framed in a dot-dashed manner in FIG. 4, in an enlarged individual representation, FIG. 6 the detail of FIG. 5 in the non-assembled state of the front carrier grip which forms the front handle, wherein the moment of the fastening of the front carrier grip to the first container housing of the first storage container is shown, FIG. 7 a preferred embodiment of a second storage container of the storage device according to the invention, in a perspective representation, said second storage container on its front side comprising a second handle which is designed as a pull grip, around which a hand cannot grip, FIG. 8 a front view of the second storage container of FIG. 7 with a viewing direction according to arrow VIII of FIG. 7, FIG. 9 a section through the second storage container according to section line IX-IX of FIG. 8, FIG. 10 the detail X which is framed in a dot-dashed manner in FIG. 8, in an enlarged representation, FIG. 11 the detail of FIG. 10 in the not yet assembled state of the second handle, wherein the moment of fastening the second handle to the second container housing is shown, FIG. 12 a perspective representation of a container housing which can be used alternatively as a first container housing or as a second container housing and whose uniform housing fastening interface is the non-equipped, grip-free state is shown, wherein additionally a first handle and a second handle are represented in the respective non-assembled state, said handles being attachable to the uniform housing fastening interface for forming a first storage container or a second storage container, FIG. 13 a perspective individual representation of the first handle which is used with the first storage container of FIGS. 1 to 6 and which is also shown in FIG. 12, in an oblique front view, FIG. 14 the first handle of FIG. 13 in an oblique view from the rear side, FIG. 15 the second handle which is used with the second storage container of FIGS. 7 to 11 and is also shown in FIG. 12, in an oblique view onto the front side, FIG. 16 the second handle of FIG. 15 in an oblique rear-view, and FIG. 17 a container stack which consists of several storage containers of the storage device which are stacked onto one another and are coupled to one another in a releasable manner and in a manner in which they cannot be vertically lifted from one another, wherein the storage container which is placed at the very bottom is a second storage container which is provided with a second handle, whereas the two further storage containers which are placed thereon are first storage containers which differ from one another in their height.

The storage device 1 which in its entirety is indicated with the reference numeral 1 comprises several storage containers 2 amongst which at least one first storage container 2*a* which is illustrated by way of example in FIGS. 1 to 6 and at least one second storage container 2*b* which is illustrated by way of example in FIGS. 7 to 11 are to be found. The first and second storage containers 2*a*, 2*b* can also be present only once or also in multiple. The storage device 1 can also comprise yet further storage containers 2 which are not illustrated in the drawing.

Figure 17:
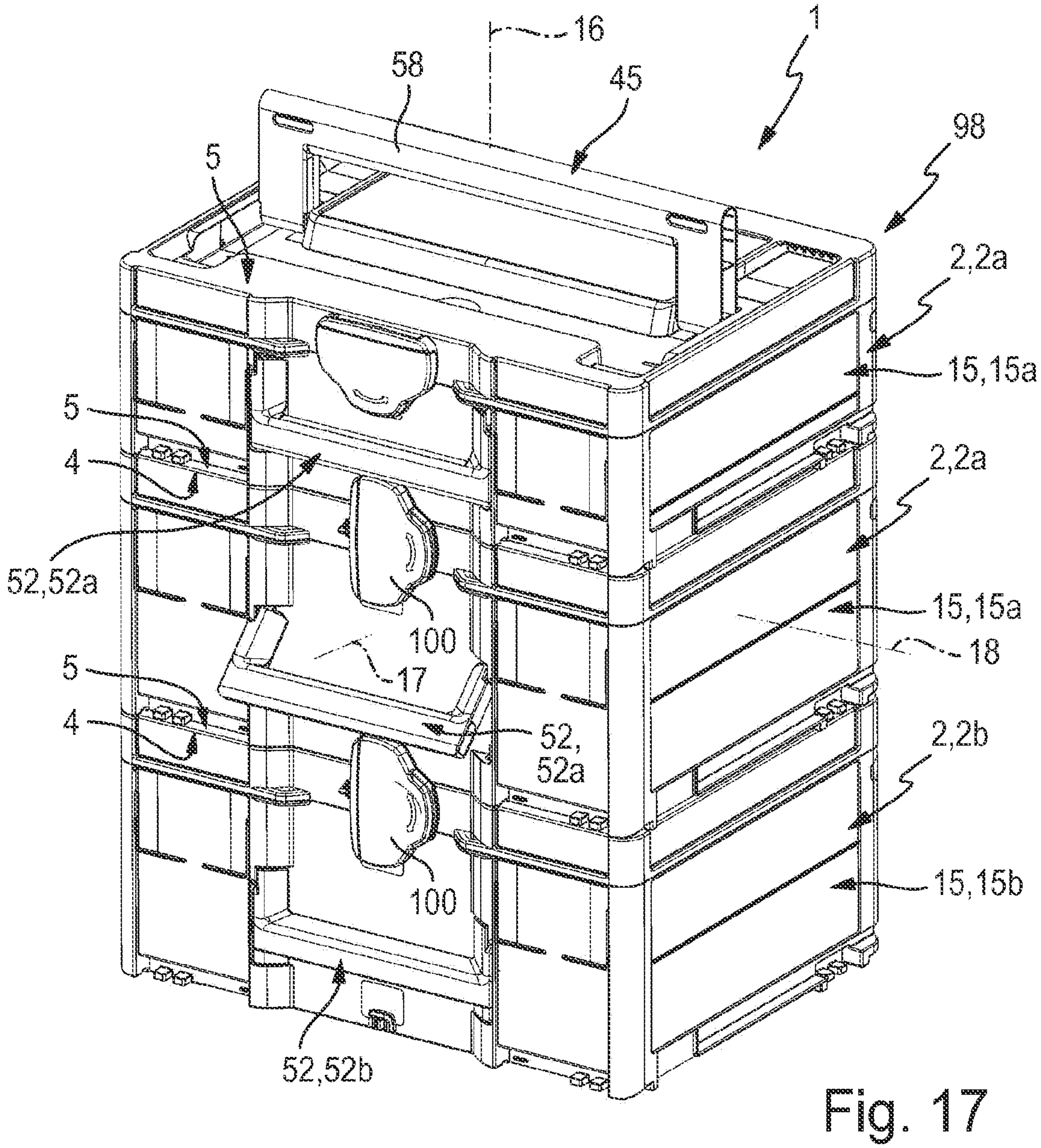

FIG. 17 shows three storage containers 2 of the storage device 1 in a state in which they are stacked onto one another whilst forming a container stack 98 and concerning which the two upper storage containers 2 are designed as first storage containers 2*a*, whereas the storage container 2 which is at the very bottom is a second storage container 2*b*. As one can derive from FIG. 17 by way of the first storage container 2*a*, several first storage containers 2*a* and/or several second storage containers 2*b* can have a different height.

Each storage container 2 comprises a container housing 15 which concerning the first storage container 2*a* is denoted as a first container housing 15*a* and concerning the second storage container 2*b* is denoted as a second container housing 15*b*.

With regard to the illustrated embodiment example, the first and the second container housing 15*a*, 15*b* are designed identically amongst one another. One and the same construction type of container housings 15 is used here as a first container housing 15*a* for forming a first storage container 2*a* and furthermore as a second container housing 15*b* for forming a second storage container 2*b*.

Figure 12:
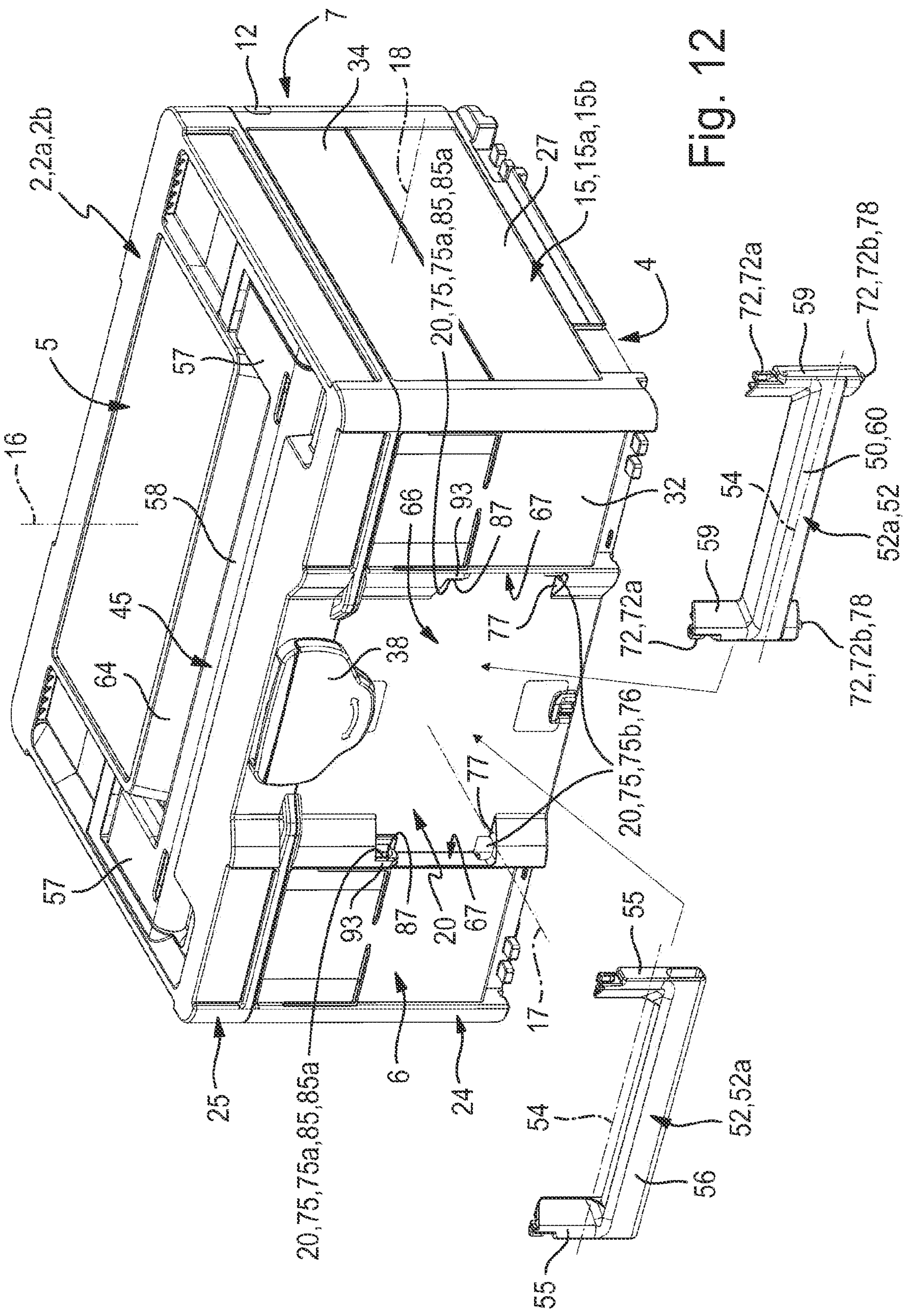
Figure 13:
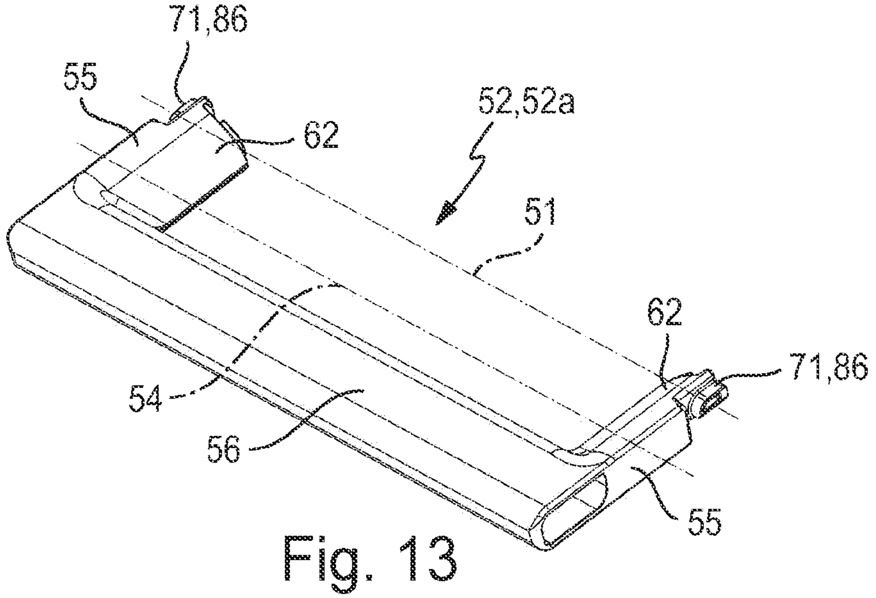
Figure 14:
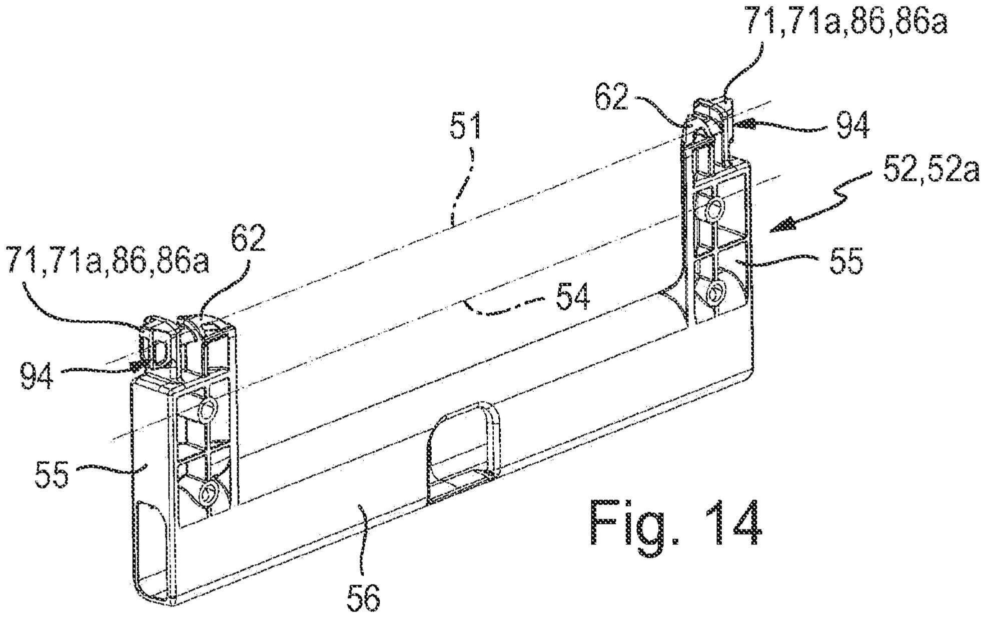
Figure 15:
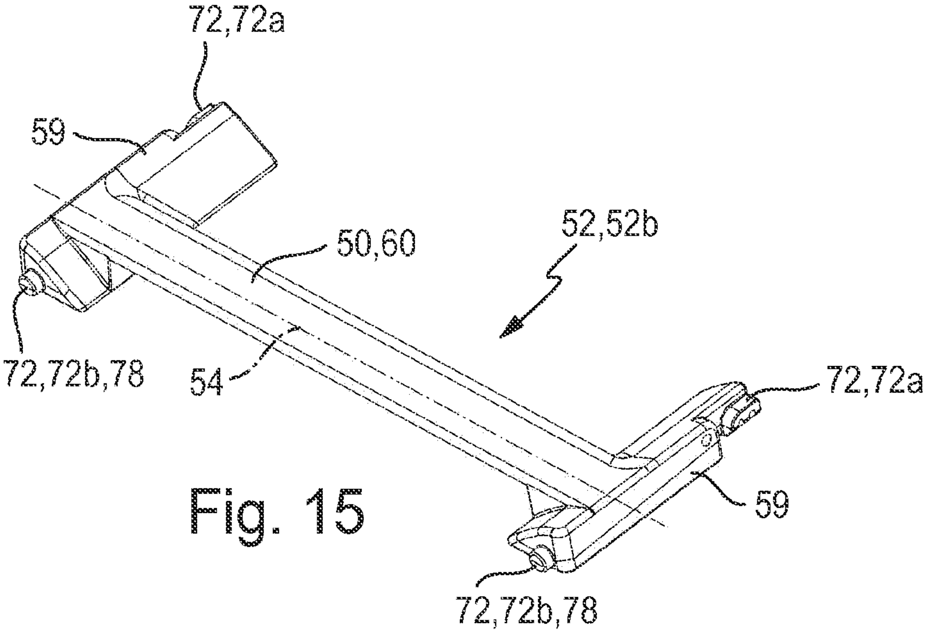
Figure 16:
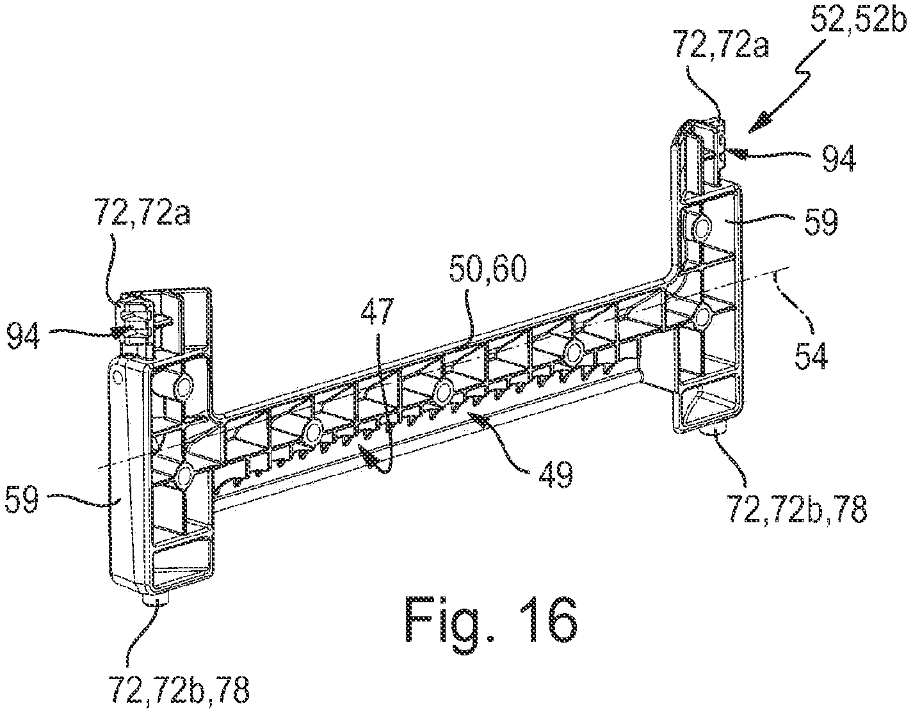

Such a container housing 15 which can be used as a first container housing 15*a* as well as a second container housing 15*b* is shown in FIG. 12. It is already equipped with an optional upper carrier grip 45 which represents an optional, but nonetheless advantageous equipping feature of the storage container 2. For forming a storage container 2, this container housing 15 is yet to be equipped with a first handle 52*a* or with a second handle 52*b*, where these two handles 52*a*, 52*b* are shown in detail in FIG. 12. A container housing 15 which is equipped with the first handle 52*a* represents a first container housing 15*a* and together with the first handle 52*a* defines the first storage container 2*a*. A container housing 15 which is equipped with the second handle 52*b* represents a second container housing 15*b* and together with the second handle 52*b* defines the second storage container 2*b*.

Inasmuch as one refers hereinafter generally to "container housing 15", this—inasmuch as no details are made to the contrary—is to be understood as a reference to the first container housing 15*a* as well as to the second container housing 15*b*.

Preferably, the first and second container housing 15*a*, 15*b* are identical amongst one another at least to the extent that they only differ from one another in their construction height. However, as can be derived from the drawing, they can also have the same height and as a whole be designed identically.

An important corresponding feature between the first and second container housings 15*a*, 15*b* is a uniform housing fastening interface 20 which is designed identically in both cases and to which in the case of the first container housing 15*a* the first handle 52*a* and in the case of the second container housing 15*b* the second handle 52*b* is fastened. Expressed differently, the first container housing 15*a* has a housing fastening interface which is for attaching the first handle 52*a* and which corresponds to a housing fastening interface of the second container housing 15*b* which serves for attaching the second handle 52*b*, so that these two housing fastening interfaces can be denoted as uniform housing fastening interfaces 20.

The container housing 15, thus the first container housing 15*a* as well as the second container housing 15*b* has a height axis 16 which extends between a lower side 4 and an upper side 5 and whose axis direction defines a height direction which is provided with the same reference numerals. Furthermore, it has a longitudinal axis 17 which is at right angles to the height axis 16 and runs between a front side 6 and a rear side 7 and further has a transverse axis 18 which is at right angles to the height axis 16 as well as to the longitudinal axis 17. The axis direction of the longitudinal axis 17 defines a longitudinal direction which is provided with the same reference numeral, whereas the axis direction of the transverse axis 18 defines a transverse direction of the container housing 15 which is provided with the same reference numeral. By way of example, the dimensions in the height direction 16 determine a height, the dimensions in the longitudinal direction 17 a depth and the dimensions in the transverse direction a width of the container housing 15. The container housing 15 preferably has an essentially at least rectangular outline.

The container housing 15 has a housing wall 22 which delimits a storage space 23 which is formed in the housing interior and which is evident for example from FIGS. 4 to 11. Any objects which are to be stored, for example tools and in particular electric tools can be accommodated in the storage space 23.

Expediently, the container housing 15 comprises a housing lower part 24 and a housing lid 25 which is pivotably movably mounted on the housing lower part 24. The housing wall 22 is composed of walls of the housing lower part 24 and of the housing lid 25.

Concerning the housing lower part 24 which is preferably designed in a box-like manner, the housing wall 22 consists of a base wall 26 which terminates the storage space 23 at the lower side 4 and of a peripheral wall 27 which projects upwards from the outer edge of this base wall 26 in the height direction 16. The peripheral wall 27 encompasses the storage space 23 around the height axis 16, wherein at its upper side which is opposite the base wall 26 it comprises an upper end section 21 which frames an access opening 28 for the storages space 23. Objects can be inserted into the storage space 23 and removed from the storage space 23 through the access opening 28.

The peripheral wall 27 which is of one piece with the base wall 26 is composed of a front wall 32 which is located at the front side 6, of a rear wall 33 which lies opposite to the front wall 32 in the longitudinal direction 17 and of two side walls 34. The side walls 34 lie opposite one another in the transverse direction 18 and each connect the front wall 32 to the rear wall 33. The front wall 32 and the rear wall 33 each essentially extend in a plane which is at right angles to the longitudinal axis 17. The side walls 34 each extend essentially in a plane which is at right angles to the transverse axis 18. These walls 32, 33, 34 can be completely plane or can be stepped in an arbitrary manner or structured in another manner.

The complete peripheral wall 27 and the base wall 26 are designed as one piece with one another.

The housing lid 25 is assigned to the access opening 28. Preferably, in the region of the rear wall 33, it is pivotably mounted relative to the housing lower part 24 about a pivot axis 35 which runs in the transverse direction 18. Preferably, the pivot bearing means 12 which define the pivot axis 35 are arranged on the rear corner regions of the peripheral wall 27 which connect the side wall 34 to the rear wall 33, in particular at only a small height distance below the access opening 28.

Figure 2:
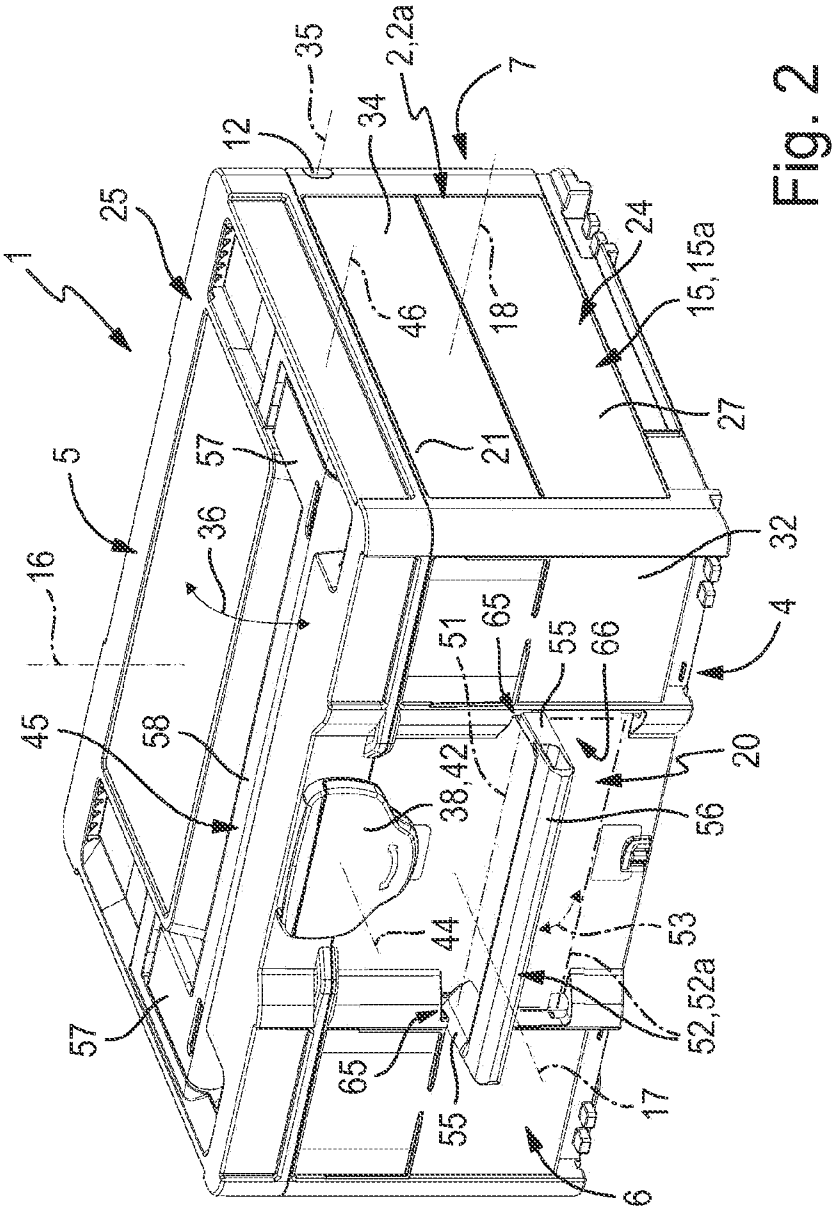
Figure 7:
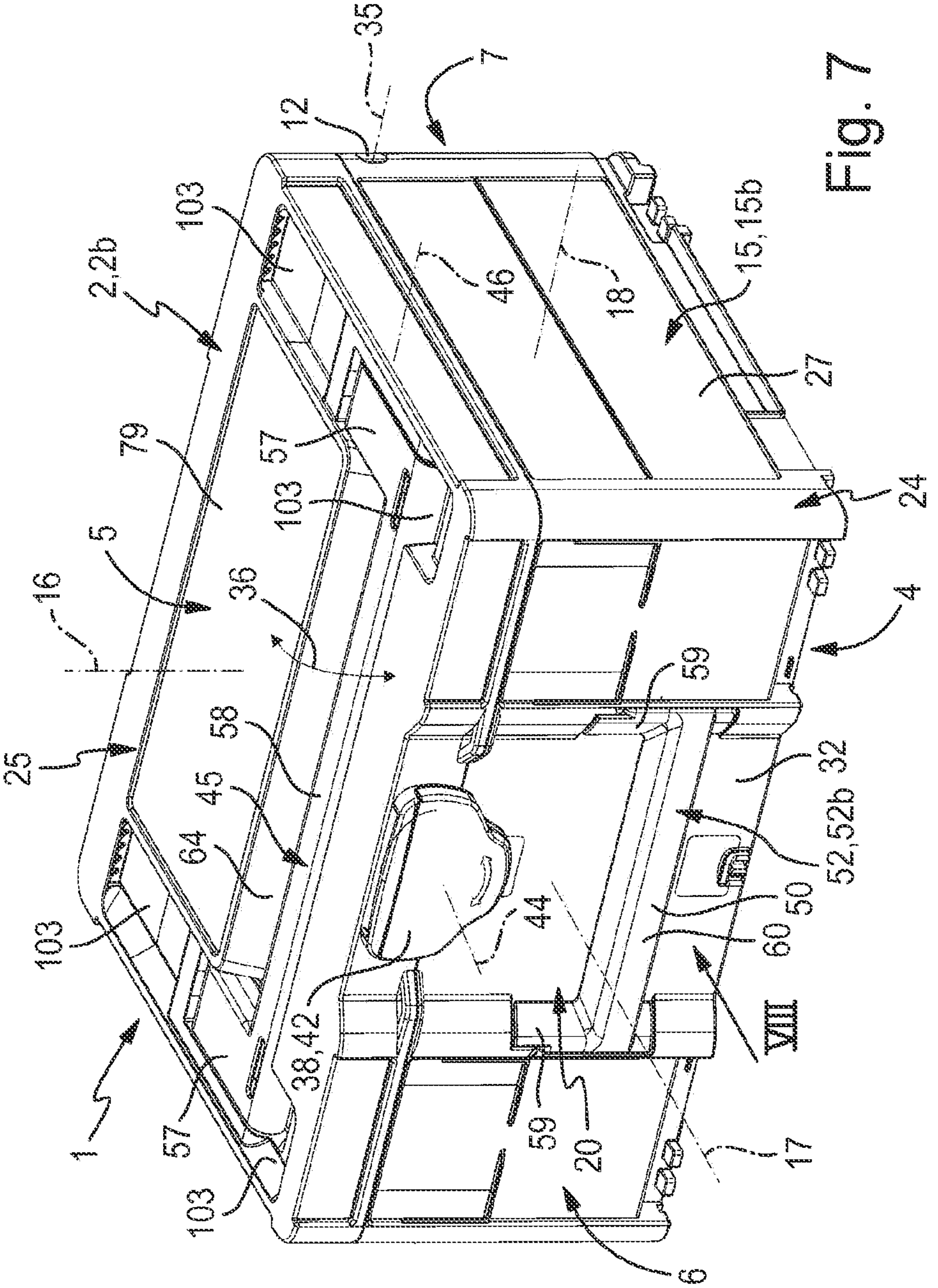

In the course of a pivoting movement 36 which is indicated by the double arrow in FIGS. 2 and 7, the housing lid 25 can be selectively positioned in a closure position which lies on the upper end section 21 of the peripheral wall 27 and herein closes the access opening 28 or in various open positions which are pivoted upwards to a greater or lesser extent. In the open positions, the access opening 28 is accessible with an opening cross section of a greater or lesser magnitude depending on the selected opening angle.

The closure position of the housing lid 25 is expediently releasably lockable. For this, by way of example, suitable locking means 38 which can be actuated manually are arranged on the container housing 15 at the outside in the region of the front side 6. The locking means 38 preferably comprise a rotary bar 42 which is rotatably mounted on the housing lid 25 in the region of the front side 6 about a rotation axis 44 which is parallel to the longitudinal axis 17, and a locking projection 43 which is arranged on the front wall 32 of the housing lower part 24 at the outside. The rotary bar 42 in the state of the housing lid 25 which is situated in the closure position can be rotated such that it is selectively in engagement with or is disengaged from the assigned locking projection 43.

The first handle 52*a* is arranged on the first container housing 15*a* on its uniform housing fastening interface 20, on the front side 6 at the outside. The second handle 52*b* is arranged on the second container housing 15*b* on its uniform housing fastening interface 20 on the front side 6 at the outside. On account of its arrangement on the front side of the container housing 15, the first handle 52*a* as well as the second handle 52*b* form a front handle which is generally indicated with the reference numeral 52. If the container housing 15 in accordance with the embodiment example is composed of a housing lower part 24 and a housing lid 25, the front handle 52 is preferably attached at the outside on the front wall 32 of the housing lower part 24. This is the case with the illustrated embodiment example.

The storage container 2 at the outside on its upper side 5 which is orientated in the height direction 16 preferably has a further handle, specifically the upper carrier grip 45 which has already been mentioned further above. If the container housing 15 comprises a housing lid 25 in accordance with the embodiment example, then the upper carrier grip 45 is attached at the outside to an upper lid wall 79 of the housing lid 25 which in the closure position extends at right angles to the height axis 16. The upper carrier grip 45 can be gripped around by a hand, in order to carry and transport the storage container 2 in an alignment which is hereinafter denoted as a vertical alignment and in which the height axis 16 runs vertically.

The first handle 52*a* which is fastened to the uniform housing fastening interface 20 of the first container housing 15*a* is designed as a carrier grip which is pivotable with respect to the container housing 15*a*, so that it can be used in order to carry the first storage container 1*a* with a hand. For this, a hand can grip around the first handle 52*a*. It has such a distance to the housing wall 22 that a human hand can grip between it and the housing wall 22, in order to grip around it. By way of the use of the first handle 52*a* which is designed as a carrier grip, the first storage container 2*a* can be carried and transported in an alignment which is hereinafter denoted as a perpendicular alignment and in which the height axis 16 is aligned horizontally.

In contrast to the first handle 52*a*, the second handle 52*b* is not envisaged for carrying the second storage container 2*b* and is also not designed accordingly. It is conceived such that it cannot be gripped around by a hand. There is no intermediate space which would permit a human hand to grip through, between the second handle 52*b* and the housing wall 22. According to the illustrated embodiment example there is preferably no intermediate space whatsoever between the second handle 52*b* and the housing wall 22.

Figure 3:
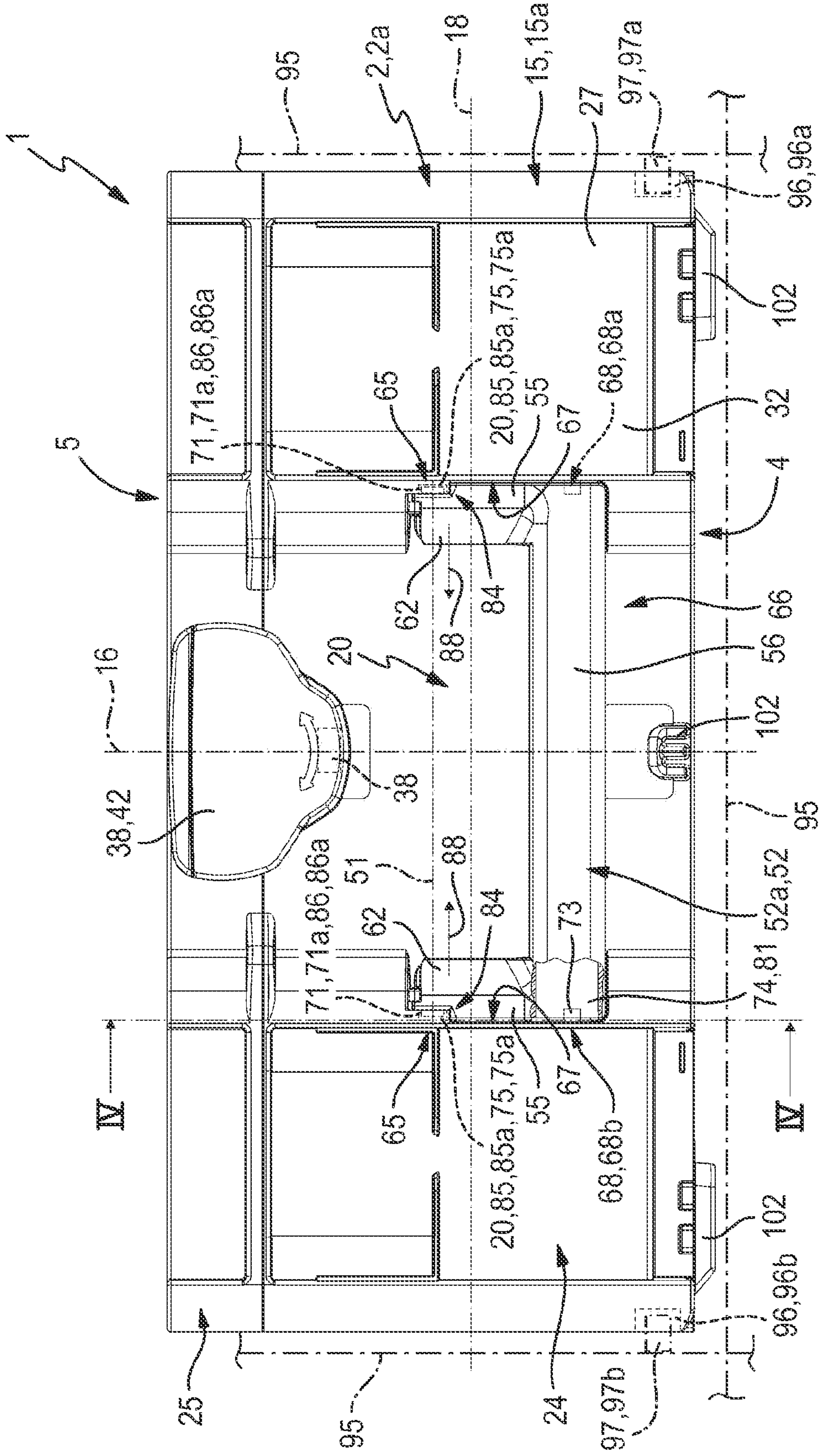
Figure 4:
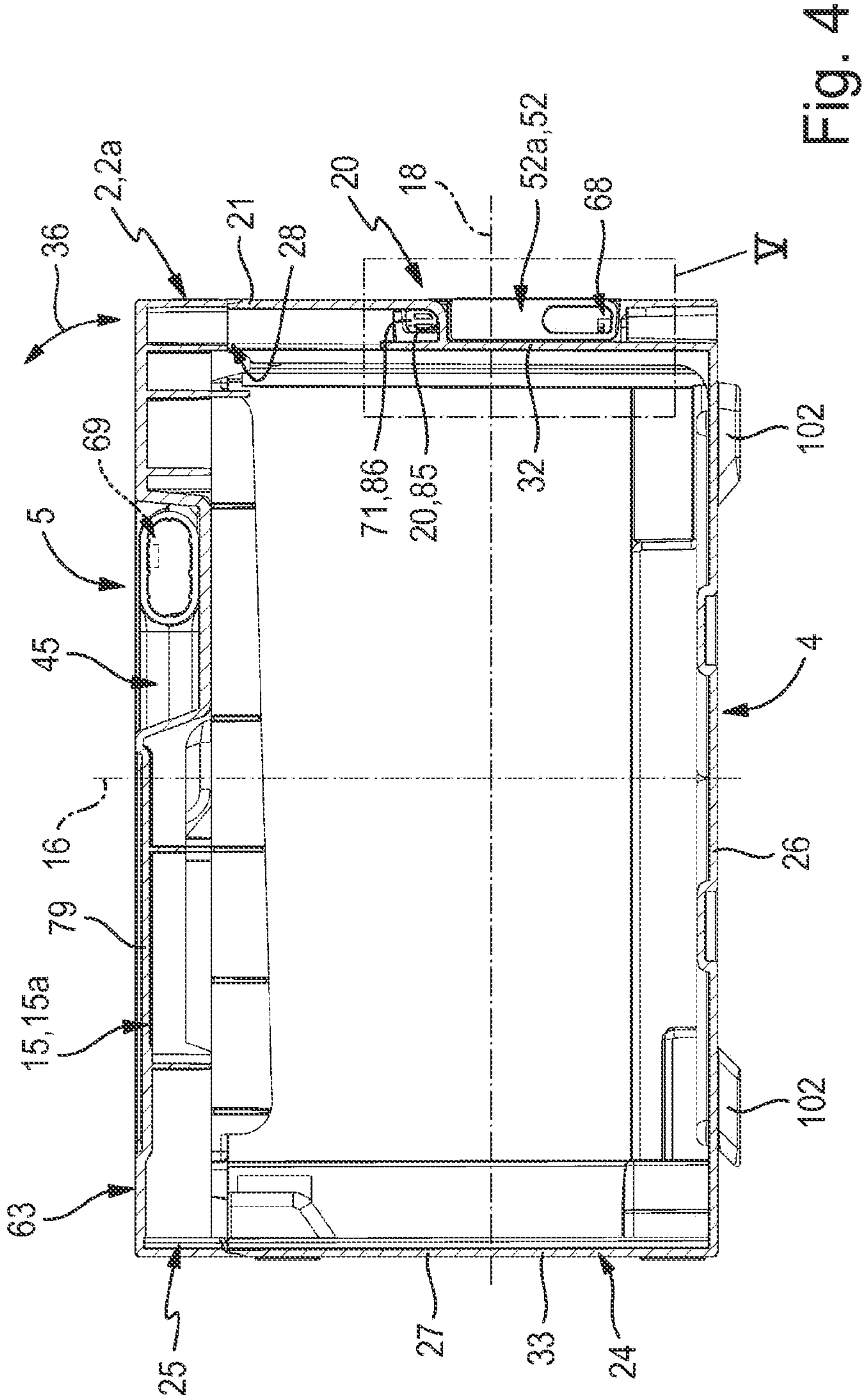
Figure 6:
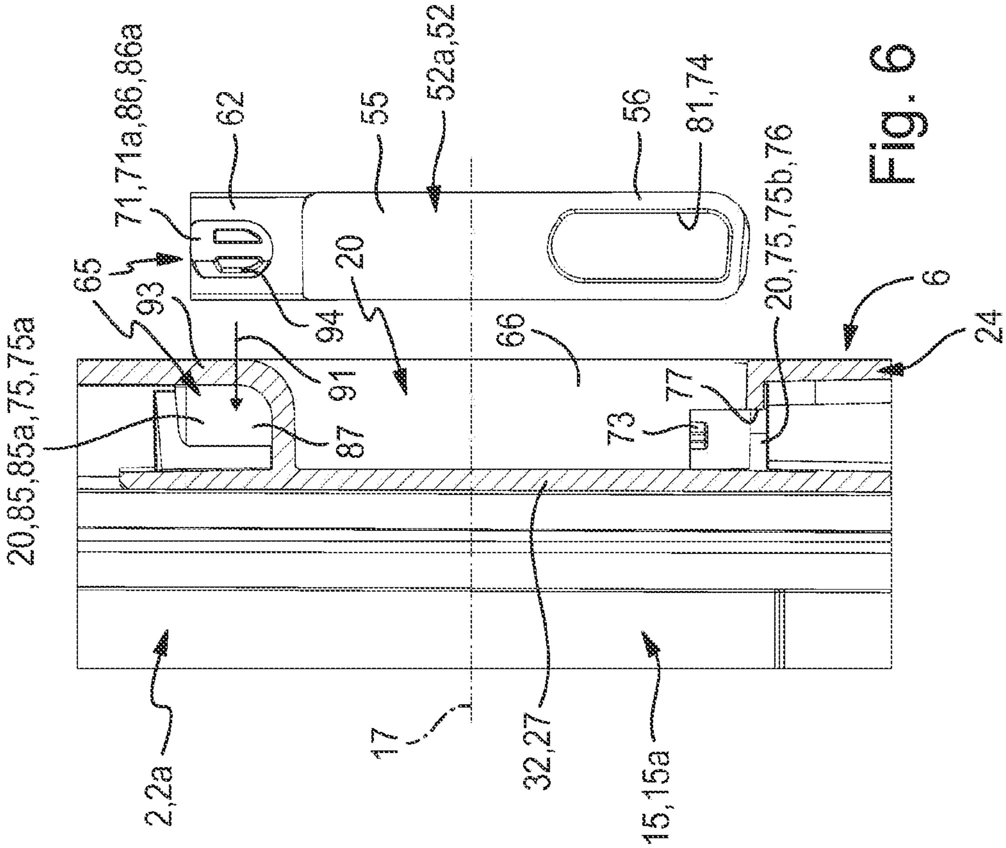
Figure 5:
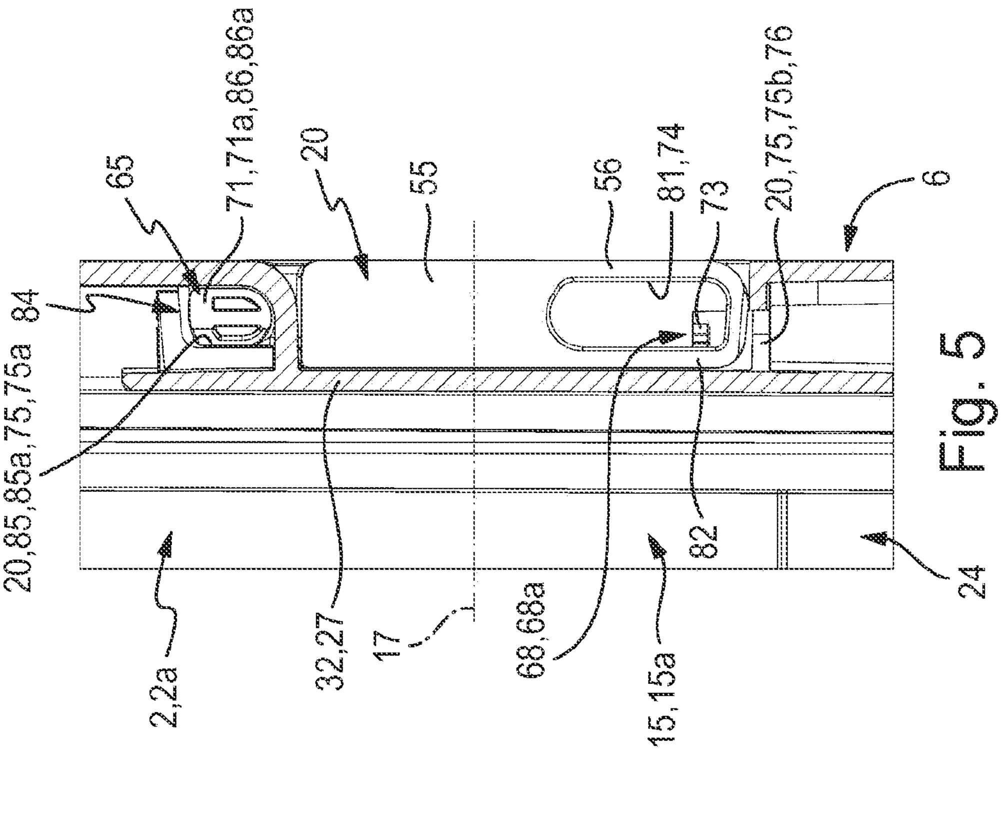

The second handle 52*b* merely defines a pull grip which is suitable, in order to pull the second storage container 2*b* in the longitudinal direction 17. In particular, this pulling function can be used, in order to pull the second storage container 2*b* out of a shelf structure 2013 of the storage device 1 which is schematically indicated in FIG. 3 and in which it can be accommodated during its position of non-use. Inasmuch as this is concerned, the second handle 52*b* merely represents a pull-out aid.

The second handle 52*b* for its handling preferably only has a rigid grip ledge 50, behind which one can engage with the fingers of a hand from the front, in order to exert a pulling force which is directed to the front in the longitudinal direction 17.

Figure 10:
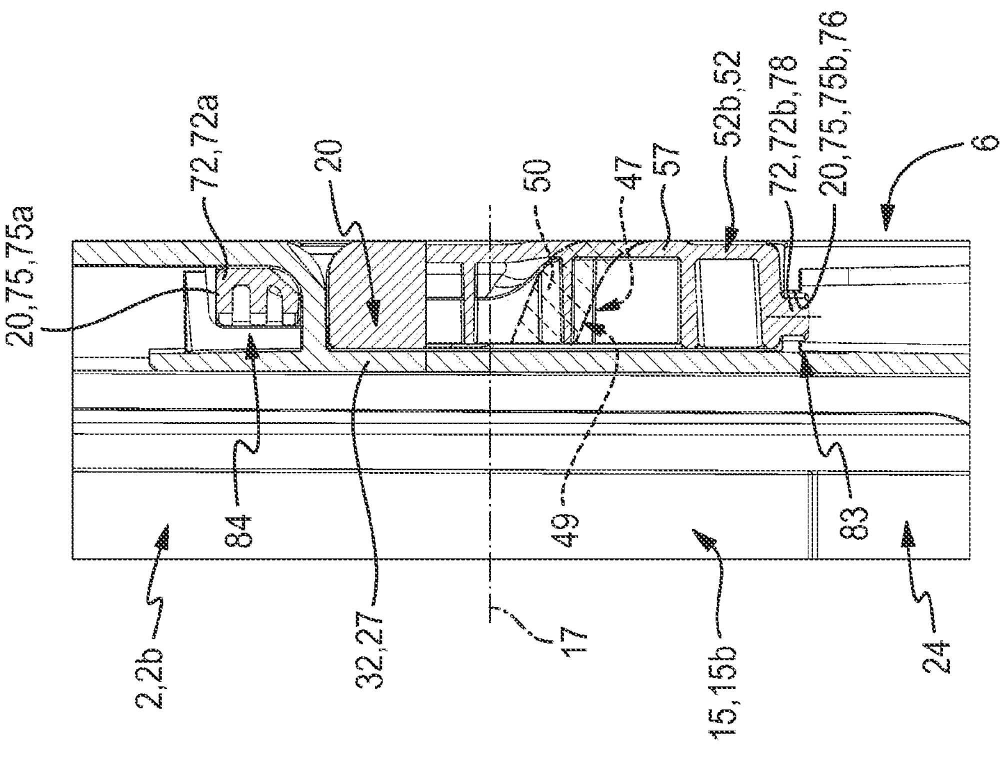

As is indicated in FIG. 10, by way of example the grip ledge 50 delimits a grip recess 47 which is open to the bottom in the height direction 16 and into which one can engage with the fingers of a hand from the front and from below, in order to impinge the rear surface 49 of the grip ledge 50. Alternatively, the open side of the grip recess 47 can also face upwards.

The grip ledge 50 at the outside connects directly onto the front wall 32 of the second container housing 15*b*, so that there remains no intermediate space which would permit the gripping-through by the hand. Herewith, the depth of the second storage container 2*b* is not significantly increased by the second handle 52*b*.

Concerning an embodiment example which is not illustrated, the second handle 52*a* which is designed as a pull grip is likewise attached to the second container housing 2*b* in a movable manner. There it can be selectively positioned in a park position or in a position of use, wherein in these two positions it projects out of an assigned deepening of the peripheral wall 27 to a different extent or in the park position does not project out of the peripheral wall 27 at all. However, what is preferred is the construction form which is realised with the illustrated embodiment example and which is very inexpensive and simple and according to which the second handle 52*b* which is designed as a pull grip is completely immovable with respect to the second container housing 15*b*.

The pivotable first handle 52*a*, just as the optional upper carrier grip 45 is pivotably mounted on the container housing 15 such that it can be selectively positioned in a position of non-use which is pivoted onto the container housing 15 or in a position of use which projects away from the container housing 15.

The first handle 52*a* which is designed as a pivotable carrier grip is pivotable about a pivot axis which is hereinafter denoted as a front pivot axis 51 for an improved differentiation, wherein the associated pivoting movement 53 is made recognisable by a double arrow.

The pivot axis of the preferably likewise present upper carrier grip 45 is hereinafter denoted as an upper pivot axis 46, wherein the associated pivoting movement 41 is likewise indicated by a double arrow in FIG. 1.

Both pivot axes 51, 46 run parallel to the transverse axis 18.

The position of non-use of the upper carrier grip 45 which is pivoted onto the container housing 15 is evident for example in FIGS. 1 and 7. Additionally, the position of use of the upper carrier grip 45 which projects upwards from the container housing 15 is shown in FIG. 1 in a dot-dashed manner.

The position of non-use of the first handle 52*a*, in which this handle which is designed as a front handle 52 is pivoted onto the first container housing 15*a*, is evident for example from FIGS. 1 and 3 to 6. In its position of use, the first handle 52*a* projects in the longitudinal direction 17 to the front away from the first container housing 15*a*, wherein this position of use is shown on the one hand in FIG. 2 and on the other hand once again in a dot-dashed manner in FIG. 1.

The first handle 52*a* is rotatably mounted on the first container housing 15*a* by way of at least one pivot bearing device 65, for carrying out the pivoting movement 53. This at least one pivot bearing device 65 defines the front pivot axis 51. Preferably, two pivot bearing devices 65 which are arranged distanced to one another in the transverse direction 18 are present for the pivoting mounting of the first handle 52*a*.

The pivotable first handle 52*a* is preferably designed as bow grip which is designed in an at least essentially U-shaped manner. This also applies to the optional upper carrier grip 45. Concerning the illustrated embodiment example, the first handle 52*a* as well as the upper carrier grip 45 is such a bow grip.

The first handle 52*a* which is designed as a bow grip has two grip limbs 55 which correspond to the U-limbs, are distanced to one another in a grip longitudinal direction 54 and are parallel to one another and are rigidly connected to one another at their one face-side end region by a connection web 56. The grip longitudinal direction 54 runs in the axis direction of a longitudinal axis of the first handle 52*a* which is provided with the same reference numeral. The grip limbs 55 run transversely thereto.

The upper carrier grip 45 in a corresponding manner likewise has two grip limbs 57 which are distanced to one another in the transverse direction 18 and which are rigidly connected to one another at one end by a connection web 58.

The preferably rod-like connection webs 56, 58 of the first handle 52*a* and of the upper carrier grip 45 expediently run parallel to one another. The upper carrier grip 45 preferably has a greater length in the transverse direction 18 than the first handle 52*a*. Both grips 45, 54*a* are expediently arranged and designed mirror-symmetrically with respect to a middle plane which is spanned by the height axis 16 and the longitudinal axis 17 and which passes through the first container housing 15*a* in the middle of the width.

The first handle 52*a* which is designed as a bow grip, in the region of the free end sections 62 of its grip limbs 55 which are opposite to its connection web 56 are pivotably mounted on the front wall 32 at the outside via one of the two pivot bearing devices 65, for executing the pivoting movement 53.

The front wall 32 at its outer side which is away from the storage space 32 is expediently provided with a front wall deepening 66, in which the two pivot bearing devices 65 are arranged. The front wall deepening 66 has such a depth in the longitudinal direction 17 that the first handle 52*a* is received completely sunk therein given the assumption of its position of non-use. In the position of use, the first handle 52 projects significantly far out of the front wall deepening 66, in order to be able to grip around the connection web 56 with one hand for carrying the first storage container 2*a*. The front wall deepening 66 preferably extends over the complete height of the front wall 32, but is expediently widened in the transverse direction 18 in the region of the housing fastening interface 20.

A gripping plane of the first handle 52*a* which is spanned by the two grip limbs 55 and the connection web 56, in the position of non-use runs at right angles to the longitudinal axis 17 and in the position of use at right angles to the height axis 16.

The front wall deepening 66 at its two sides which are distanced to one another in the transverse direction 18 are delimited by two lateral edge surfaces 67 which face one another and are distanced to one another in the transverse direction 18. Each pivot bearing device 65 is preferably placed in the region of one of these two lateral edge surfaces 67, in particular in the widened region.

The first handle 52*a* is expediently pivoted downwards in the position of non-use 45*a*, which is to say its U-opening points upwards in the height direction 15.

The upper carrier grip 45 is pivotably mounted on the housing lid 25 in the region of the free end sections 63 of its grip two limbs 57 which are opposite to its connection web 58. In the position of non-use of the upper carrier grip 45, a grip plane which is spanned by the connection web 58 and the two grip limbs 57 runs at right angles to the height axis 16. The upper carrier grip 45 is expediently pivoted to front in the position of non-use, so that its U-opening faces the bottom in the position of non-use Preferably, the upper lid wall 79 which belongs to the housing wall 22, at the outside comprises an upper wall deepening 64, in which the upper carrier grip 45 is rotatably mounted and in which the upper carrier grip 45 is received in a completely sunk manner on assuming its position of non-use. The upper wall deepening 64 is preferably likewise designed in a U-shaped manner. In the position of use, the upper carrier grip 45 projects upwards out of the upper wall deepening 64, wherein the connection web 58 is distanced sufficiently far to the upper lid terminating surface 63, in order to be able to be gripped around by the hand for carrying the storage container 2.

Alternatively to the pivotable upper carrier grip 45, the storage container 2 can also comprise an upper carrier grip 45 which is non-pivotably attached to the container housing 15 in a fixed manner.

Expediently, an arresting device 68 of the first storage container 2*a* which is designed for the non-pivotable releasable arresting of the first handle 52*a* in its position of non-use is assigned to the pivotable first handle 52*a*. This arresting device 68 is hereinafter also denoted as a front arresting device 68 for an improved differentiation.

The front arresting device 68 prevents the first handle 52*a* which is situated in the position of non-use from executing uncontrolled pivoting movements relative to the first container housing 15*a* when the first storage container 2*a* is transported whilst using the upper carrier grip 45.

The front arresting device 68 by way of example is advantageously designed as a latching device which, depending on the pivoting direction of the pivoting moment 53, automatically latches in or out with a snap effect when a respective actuation force is introduced into the first handle 52*a*. The intensity of the latching is adequately large, in order, given a designated handling of the first storage container 2*a*, to prevent an automatic latching in or latching out of the first handle 52*a*. However, it is adequately small, in order to be able to create a latching or a lifting of the latching solely by way of action with the hand without an extraordinary force effort.

The pivoting angle of the first handle 52*a* between the position of non-use and the position of use is expediently at least essentially 90 degrees. The first handle 52*a* can be pivoted within this pivot range into arbitrary intermediate positions which are all neither arrested nor arrestable, in particular in an infinite manner Thus as soon as the first handle 52*a* has left the arrested position of non-use, it can be freely pivoted at least to into the position of use. Given a corresponding design of the pivot bearing devices 65, the first handle 52*a* can even be pivoted beyond the position of use.

The front arresting device 68 can be locally restricted to a single region of the first handle 52*a*. However, it is seen to be more advantageous if the front arresting device 68 consists of two arresting units 68*a*, 68*b* which are arranged locally distanced to one another in the axis direction of the pivot axis 51.

Preferably, the two arresting units 68*a*, 68*b* of the front arresting device 68 which are hereinafter also denoted as front arresting units 68*a*, 68*b* for simplification, are each arranged in the region of one of the two grip limbs 55. Preferably, they are each located in the region of one of the two lateral edge surfaces 67 of the front wall deepening 66.

The front arresting units 68*a*, 68*b* are arranged distanced to the pivot bearing device 65 which define the pivot axis 51, preferably transversely to the pivot axis 51. In particular, they are located at a distance to the pivot axis 51 which corresponds to the distance of the connection web 56 to the pivot axis 51. By way of example, both front arresting units 86*a*, 86*b* lie in the region of the connection web 56 in the position of non-use of the first handle 52*a*.

Preferably, each front arresting unit 68*a*, 68*b* comprises an arresting projection 73 which is arranged on the housing wall 22 of the container housing 15 and in particular is designed as one piece with the housing wall 22 and is designed for example in a pimple-like manner Each arresting projection 73 is preferably formed on one of the two lateral edge surfaces 67, with regard to which it projects in the transverse direction 18, so that it projects into the front wall deepening 66 from the side.

Each front arresting unit 68*a*, 68*b* further has an arresting deepening 75 which is arranged on the first handle 52*a*. The opening of the arresting deepening 74 faces the transverse direction 18. The arresting deepening 74 is placed such that the assigned arresting projection 73 in the position of non-use of the first handle 52*a* engages into it in the transverse direction 18 and by way of this fixes the position of non-use of the first handle 52*a*.

Preferably, the arresting deepenings 74 of the two front arresting units 68*a*, 68*b* are formed by the end regions of a cavity 81 which are assigned to the two grip limbs 55, said cavity passing through the connection web 56 in its longitudinal direction. In the position of non-use, each arresting projection 73 immerses from a face side into the cavity 81 and engages behind a wall section 82 of the connection web 56 which peripherally encompasses this cavity 81. This is well evident in FIG. 5. The wall section 82 can be moved past the arresting projections 74 with a snap effect by way of the pivoting movement 53 of the front handle 52.

It is to be understood that the design of the arresting projections 73 and of the arresting deepenings 74 with respect to the container housing 15 and the first handle 52*a* can also be exchanged.

It is advantageous if an arresting device 69 which is suitable for the releasable arresting of the position of non-use of the upper carrier grip 45 is assigned to this, said arresting device being denoted hereinafter as an upper arresting device 69 for an improved differentiation.

The function of the upper arresting device 69 with respect to the upper carrier grip 45 is the same as the function of the front arresting device 68 with respect to the first handle 52*a*.

The upper arresting device 69 is preferably constructed in the same manner as the front arresting device 68. Accordingly, concerning the embodiment example, it comprises two upper arresting units 69*a*, 69*b* which are each assigned to one of the two grip limbs 57 and each comprise an arresting projection which is formed on the housing lid 25 as well as an arresting deepening which is formed on the upper carrier grip 45. The upper arresting device 69 is preferably also designed such that given a manually created pivoting of the upper carrier grip 45, it automatically latches in or out with a snap effect depending on the pivoting direction.

The two pivot bearing devices 65 which are assigned to the first handle 52*a* each comprise two first and second bearing elements 85, 86 which engage into one another in the axis direction of the pivot axis 51 and are rotatable relative to one another about the pivot axis 51 as the centre. The first bearing element 85 is formed on the front wall 32 of the container housing 15, the second bearing element 86 on the first handle 52*a*.

Each first bearing element 85 is expediently located in the region of one of the two lateral edge surfaces 67 of the front wall deepening 66. The first bearing element 85 is preferably designed as a bearing eye 85*a*, thus as a wall deepening which comprises an insert opening 87 which faces in the transverse direction 18 towards the first handle 52*a*.

Each second bearing element 86 is located on one of the two grip limbs 57 in the region of the free end section 62. Concerning the embodiment example, it is designed as a bearing pin 86*a* which points away from the first handle 52*a* in the grip longitudinal direction 54 and which immerses through the insert opening 87 from the front wall deepening 66 into the assigned bearing eye 85*a*.

Alternatively, the arrangement can also be exchanged, so that the two bearing pins 86*a* are arranged in the region of the lateral edge surfaces 67 and face one another with the free ends, wherein a bearing eye 85*a* whose inert openings 87 point away from one another in the grip longitudinal direction 54 is assigned to each grip limb 87.

The first bearing elements 85 are preferable designed as one piece on the housing wall 22. The second bearing elements 86 are preferably designed as one piece on the first handle 52*a*.

For fastening on the uniform housing fastening interface 20 of the container housing 15, the first handle 52*a* which is designed as a pivotable carrier grip is provided with a first grip fastening interface 71. Furthermore, the second handle 52*b* which is designed as a pull grip is provided with a second grip fastening interface 72. Both grip fastening interfaces 71, 72 are designed such that they fit together with the uniform housing fastening interface 20 and by way of interaction with this uniform housing fastening interface 20 are fixable or fixed on the first and second container housing 15*a*, 15*b* respectively.

Basically, the first and the second grip fastening interface 71, 72 can also be designed identically amongst one another. However, depending on the type of handle, it can be expedient, for example on account of certain strength demands, to fall back on first and second grip fastening interfaces 71, 72 which are designed differently from one another. This is the case with the embodiment example, where the first grip fastening interface 71 is designed differently from the second grip fastening interface 72. Irrespective of this, each handle 52*a*, 52*b* can be fastened with its grip fastening interface 71, 72 to the uniform housing fastening interface 20 of the container housing 15.

Preferably, the uniform housing fastening interface 20 comprises a plurality of individual housing fastening sections 75. By way of example, precisely four such housing fastening sections 75 are present and these—considered from the front side 6—expediently lie in the corner regions of an imagined rectangle which above all can be easily understood by way of FIG. 12. Two housing fastening sections 75 each lie at the same height in the height direction 16 and thus on a line in the transverse direction 18. Furthermore, these two pairs of housing fastening sections 75 can be arranged distanced to one another in the height direction 16.

The first grip fastening interface 71 is now formed on the first handle 52*a* such that it is in fastening engagement with only some of the present housing fastening sections 75 of the uniform housing fastening interface 20. With regard to the second handle 52*b*, the second grip fastening interface 72 however is designed such that it is in fastening engagement with all housing fastening sections 75 of the uniform housing fastening interface 20.

In other words, one can say that the uniform housing fastening interface 20 of the second container housing 15*b* is completely used by the second grip fastening interface 72 of the second handle 52*b*, whereas the uniform housing fastening interface 20 of the first container housing 15*a* is only partly used by the first grip fastening interface 71 of the first handle 52*a*.

However, the first and the second grip fastening interfaces 71, 72 are preferably designed such that certain constituents of the uniform housing fastening interface 20 are used by both grip fastening interfaces 71, 72.

Accordingly, preferably several of the housing fastening sections 75 are each designed as a common housing fastening section which is used by both grip fastening interfaces 71, 72. Furthermore, preferably several other of the housing fastening sections 75 are each designed as an individual housing fastening section 75*b* which is only in engagement with constituents of the second grip fastening interface 72.

Preferably, the uniform housing fastening interface 20 comprises two common housing fastening sections 75*a* and two individual housing fastening sections 75*b*. With respect to the already mentioned rectangular arrangement, the two common housing fastening sections 75*a* are arranged above the two individual housing fastening sections 75*b* in the height direction 16.

Preferably, a common housing fastening section 75*a* and an individual housing fastening section 75*b* which is arranged more deeply with regard to height, lie at least essentially on a line in the height direction 16.

The housing fastening sections 75 are preferably arranged in the region of the two lateral edge surfaces 67 of the front wall deepening 66. A common housing fastening section 75*a* and an individual housing fastening section 75*b* which is arranged therebelow in the height direction 16 is preferably assigned to each lateral edge surface 67.

Each of the two grip fastening interfaces 71, 72 has two primary grip fastening sections 71*a*, 72*a*. Whereas the first grip fastening interface 71 furthermore has no further grip fastening sections, the second grip fastening interface 72 yet additionally has two secondary grip fastening sections 72*b*. The two primary grip fastening sections 71*a*, 72*a* lie on a line which is parallel to the grip longitudinal direction 54. Their clear distance corresponds to the clear distance between the common housing fastening sections 75*a* of the uniform housing fastening interface 20.

The two secondary grip fastening sections 72*b* likewise lie on a line which is parallel to the grip longitudinal axis 54, but are however arranged offset to the primary grip fastening sections 72*a* at right angles to the grip longitudinal direction 54. Their clear distance corresponds to that of the individual housing fastening sections 75*b* of the uniform housing fastening interface 20.

Concerning the first storage container 1*a*, the first handle 52*a* is fastened with its two primary grip fastening interfaces 71*a* exclusively to the two common housing fastening sections 75*a*.

Concerning the second storage container 1*b*, the second handle 52*b* with its two primary grip fastening sections 72*a* is fastened to the two common fastening sections 75*b*, whereas it is simultaneously fastened with its two secondary grip fastening sections 72*b* to the two individual housing fastening sections 75*b*.

Hence by way of example, the first handle 52*a* is fixed to the uniform housing fastening interface 20 by way of a two point fastening and the second handle 52*b* by way of a four-point fastening.

Preferably, the two common housing fastening sections 75*a* simultaneously each form one of the two first bearing elements 85 of a pivot bearing device 65. Furthermore, the two primary grip fastening sections 71*a* of the first handle 52*a* each form one of the two second bearing elements 86 of the two pivot bearing devices 65. The pivotable mounting of the first handle 52*a* on the first container housing 15*a* automatically results by way of this by way of the first handle 52*a* being assembled with the first grip fastening interface 71 on the uniform housing fastening interface 20.

Concerning the second storage container 2*b*, the common housing fastening sections 75*a* which engage into one another and the primary grip fastening sections 72*a* do not define a pivot mounting, but each define only one of four fixed points for the attachment of the second handle 52*b* which is immovable with respect to the second container housing 15*b*.

Concerning the second handle 52*b*, the primary grip fastening sections 72*a* are preferably designed similarly or equally as the primary grip fastening sections 71*a* of the first handle 52*a*. By way of this, a fastening engagement with the common housing fastening interfaces 75*a* of the uniform housing fastening interface 20 which is comparable to the first handle 52*a* is possible. Additionally however, the secondary grip fastening sections 72*b* of the second handle 52*b* which are in engagement with the individual housing fastening sections 75*b* of the uniform housing fastening interface 20 ensure two further fixed points and thus as a whole an immovable mounting of the second handle 52*b* on the second container housing 15*b*.

The primary grip fastening sections 72*a* of the second handle 52*b* can be designed differently from the primary grip fastening sections 71*a* of the first handle 52*a*. In any case, the two primary grip fastening sections 72*a*, 71*a* are however designed such that they can each assume a fastening engagement with the common housing fastening sections 75*a*.

According to the preferred embodiment example, each individual housing fastening section 75*b* of the uniform housing fastening interface 20 consists of a fixation recess 76 which is formed in the front wall 32 as one piece and which has an insert opening 77 which faces upwards in the height direction 16. Each secondary grip fastening section 72*b* of the second handle 52*b* is formed by a downwardly projecting fixation pin 79. The fixation pins 78 are aligned at right angles with respect to the grip longitudinal axis 54 of the second handle 52*b*. In the assembled state, the fixation pins 78 each engage from above in the height direction 16 into one of the fixation recesses 76, so that the second handle 52*b* can no longer be taken away from the front wall 32 to the front.

The fixation recesses 76 and the fixation pins 78 are designed such that together they define an insert-pivot connection device 83, for the simple assembly of the second handle 52*b*. This accordingly applies if the secondary grip fastening sections 72*b* and the individual housing fastening sections 75*b* are designed in a different manner, for example by way of an exchange of the fixation pin and the fixation recess.

In particular, in the context of such an insert-pivot connection device 83, it is advantageous if the common housing fastening sections 75*a* of the uniform housing fastening interface 20 together with the primary grip fastening sections 72*a* of the second handle 52*a* as well as together with the primary grip fastening sections 71*a* of the first handle 52*a* each from latching connection device 84.

Figure 8:
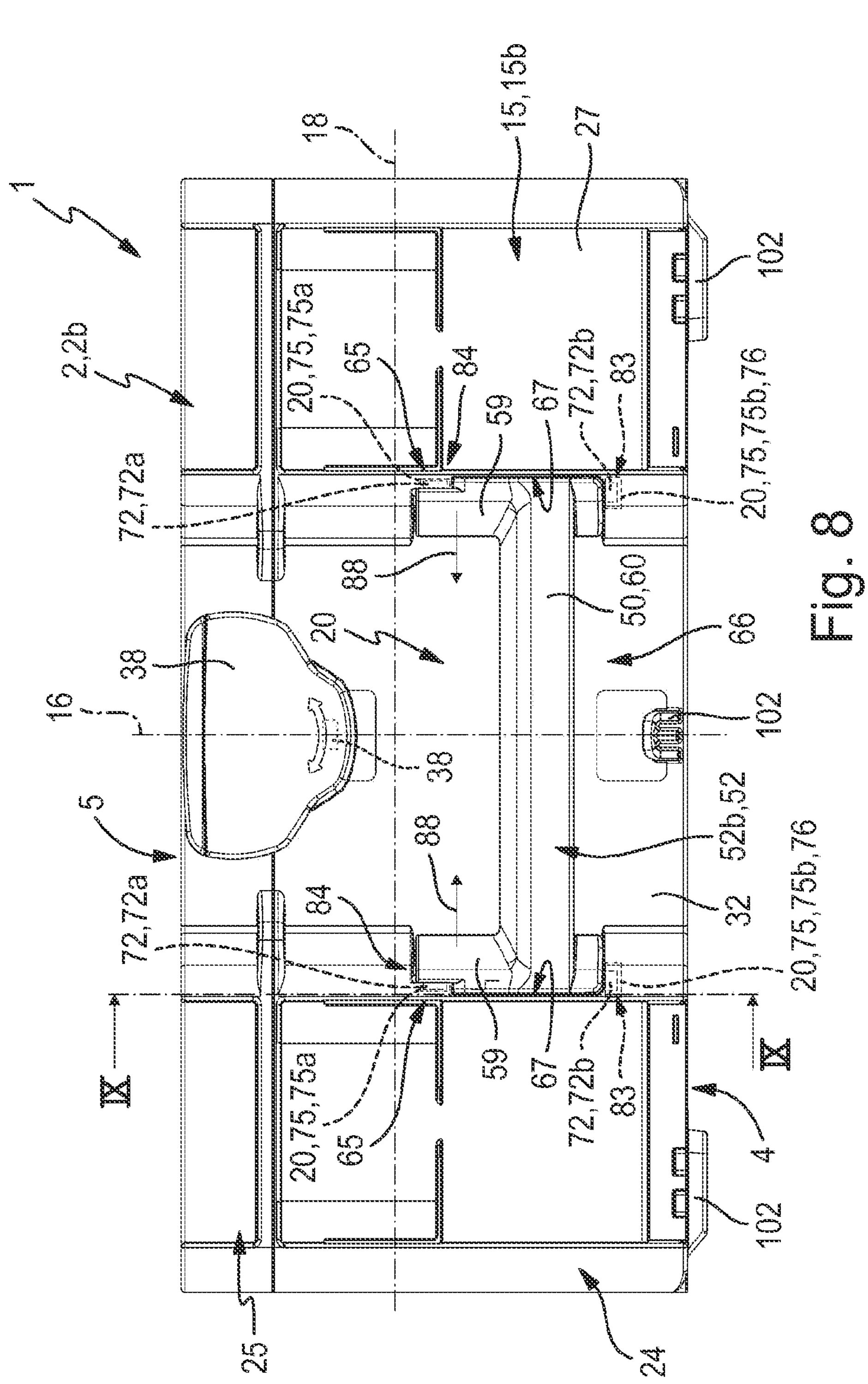
Figure 9:
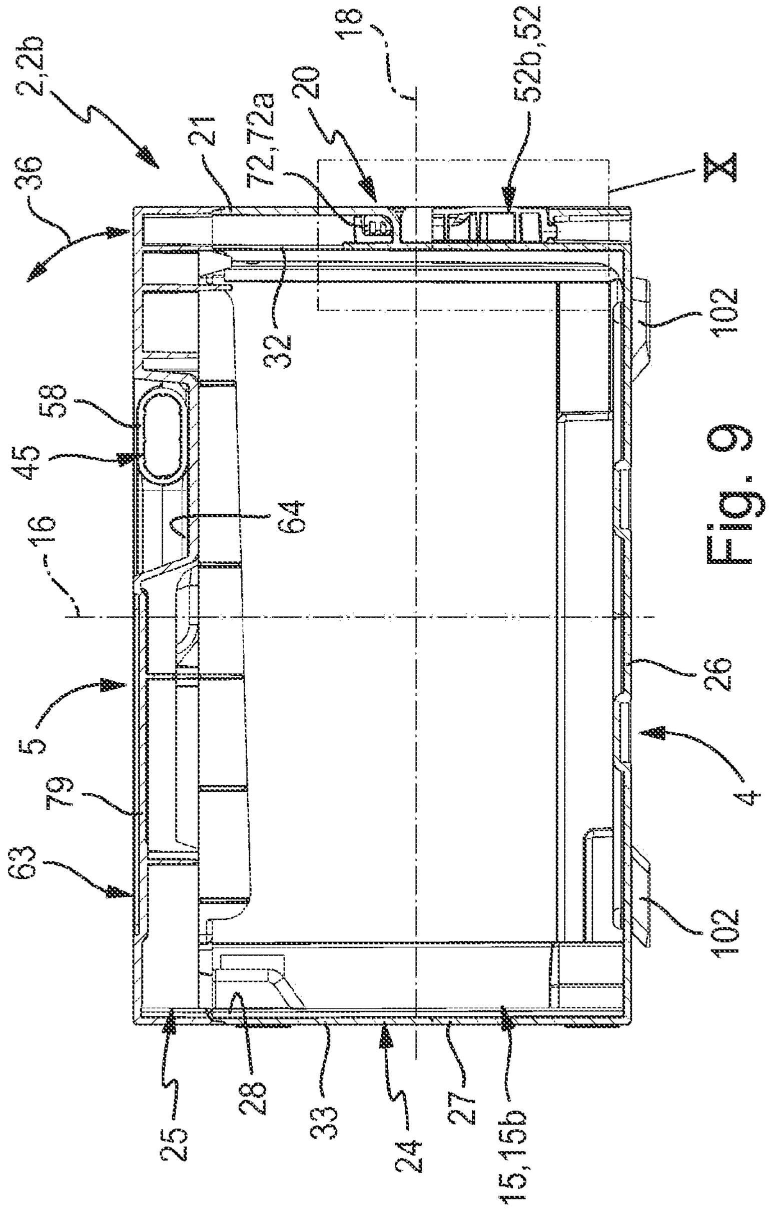
Figure 11:
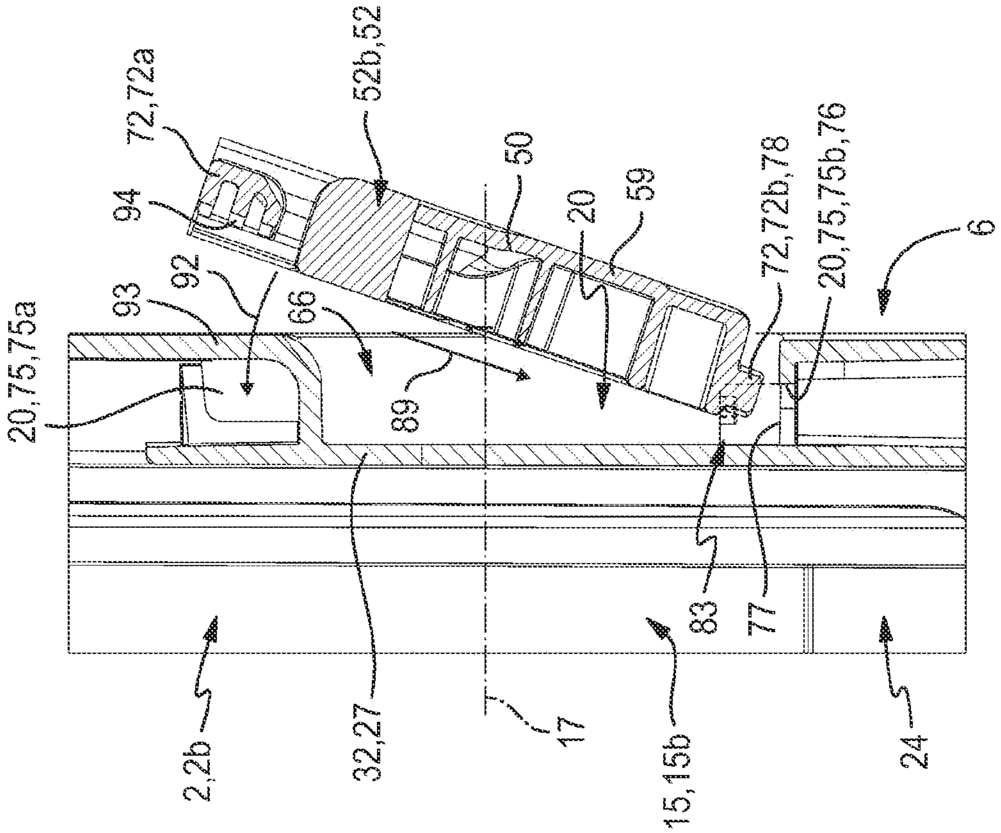

The latching connection device 84 results from the primary grip fastening sections 71*a*, 72*a* being able to be deflected out or bent according to the arrows 88 in the FIGS. 3 and 8 in the context of a mutual approach on account of a certain elasticity of the assigned handle 52*a*, 52*b* which consist of plastic material. If the first or second handle 52*a*, 52*b* is pressed onto the front wall 32 of the first and second container housing 15*a*, 15*b* respectively according to the arrows 91, 92 in FIGS. 6 and 11, the primary grip fastening sections 71*a*, 72*a* slide on a guide structure 93 which is formed by a section of the front wall 32, in a manner such that they briefly move towards one another and subsequently snap into the common housing fastening sections 75*a* on account of elastic resilience.

For this purpose, the primary grip fastening sections 71*a*, 72*a* preferably and in particular at the face side are provided with an oblique slide surface 94. The guide structure 93 with the embodiment example consists of a wall section of the container housing 15 which edges the insert opening 87 of the bearing eye 85*a*.

Concerning the first handle 52*a*, a spring-elastic compliance of the primary grip fastening sections 71*a* in particular results from the fact that the first primary grip fastening sections 71*a* are arranged on the free end sections 62 of the two grip limbs 55. With regard to the latching procedure, in particular the connection web 56 can also briefly sag. The assembly can be effected according to FIGS. 5 and 6 with a linear assembly movement 91 which is indicated by arrow 91 and which is orientated in the longitudinal direction 17.

Concerning the second handle 52*b* which is designed solely as a pull grip, a comparable elastic compliance of the primary grip fastening sections 72*a* can be advantageously realised by way of the second handle 52*b* being designed in an H-shaped manner and comprising two grip limbs 59 which are parallel to one another and which are connected to one another as one piece via a connection web 60. Herein, the connection web 60 defines the grip ledge 50 which can be gripped on using the second handle 52*b*.

The second handle 52*a* which is assembled on the second container housing 15*b*, with its two grip limbs 59 as well as with its connection web 60 which defines the grip ledge 5 expediently bears on the housing wall 22, by way of example on the front wall 32.

The two grip limbs 59 of the second handle 52*b* run at right angles to the grip longitudinal axis 94 and in the assembled state of the second handle 52*a* in the height direction 16. They comprise two free end sections which are opposite one another and on which the constituents of the second grip fastening interface 72 are attached. The primary grip fastening sections 72*a* are located on the free end sections of the two grip limbs 59 which point upwards in the same direction. The secondary grip fastening sections 72*b* are formed on the opposite, downwardly pointing free end sections of the two grip limbs 59. Here too, the length sections of the grip limbs 59 which carry the primary grip fastening sections 72*a* can bend to one another according to the arrows 88 when the second handle 52*b* is pressed into the uniform housing fastening interface 20 according to the arrow 92 in FIG. 11.

The assembly of the second handle 52*b* on the uniform housing fastening interface 20 is effected by way of a combined insert-pivot procedure which is indicated in FIG. 12. For this, the second handle 52*a* is firstly inserted in a position which is inclined with respect to the height axis 16, with the fixation pins 78 from above into the fixation recesses 76 according to arrow 89, whereupon the second handle 52*b* is pivoted onto the front wall 32 by way of an arcuate assembly movement according to arrow 92, so that the primary grip fastening sections 72*a* can be latched with the common housing fastening sections 75 via the latching connection device 84.

The latching connection which can be achieved by the latching connection device 84 can be a non-releasable connection. However, it can also be designed in a releasable manner so that if required there exists the possibility of exchanging a defect handle 52*a*, 52*b* or retrofitting a container housing 15 with regard to the grip.

Differing from the illustrated embodiment example, one or more storage containers 2, 2*a*, 2*b* as a whole can be designed only in a box-like manner without a lid. With regard to the embodiment example, hence the container housing 15, 15*a*, 15*b* as a single housing part could only comprise the housing lower part 24 and comprise no housing lid 25. The access opening 28 would then be constantly open in this case.

A lid-less container housing 24 on the upper side can also comprise an upper carrier grip which is expediently pivotably attached, for example to the side walls 34. In this case, a first handle 52*a* or a second handle 52*b* could selectively be attached to the uniform housing fastening interface 20.

If no upper carrier grip is present, then the lid-less storage container 2 is expediently a first storage container 2*a* which on the uniform housing fastening interface 20 comprises a first handle 52*a* which is designed as a pivotable carrier grip.

This also applies to cases, in which a storage container 2 which is provided with a housing lid 25 has no upper carrier grip 45.

Disregarding the first handle 52*a* or the second handle 52*b*, the container housing 15 of the storage container 2 preferably no longer comprises a further handle on the peripheral wall 27. Expediently, it is solely and singularly a first handle 52*a* or a second handle 52*b* which is fastened on the front side 6.

An advantageous design of the storage device 1 comprises the shelf structure 95 which has already been mentioned above, is merely indicted in a schematic dot-dashed manner in FIG. 3 and is designed in order to mount the storage containers 2, 2*a*, 2*b* whilst not in use. The shelf structure 95 provides the possibility of receiving each storage container 2 in a manner in which it can be pulled out in the manner of a drawer. Such a shelf structure 95 can be installed for example in a workshop or in a service vehicle.

In this context, each storage container 2 at the outer side of the housing lower part 24 comprises a guide device 104, via which it can be brought in a linearly displaceable manner into engagement in a releasable manner by way of a counter guide device 105 of the storage device 1 which is arranged on the shelf structure 103.

By way of example, the guide device 96 comprises a guide rail 96*a*, 96*b* on the outer side of each side wall 34 in the region of the lower side 4. The counter guide device 97 has two counter guide rails 97*a*, 97*b* for each storage container 2 to be received, and these are arranged distanced to one another on the shelf structure 95 in a manner such that the storage containers 2 can be brought into engagement with them from a face side by way of their guide rails 96*a*, 96*b*. The guide rails 96*a*, 96*b* and the counter guide rails 97*a*, 97*b* are matched to one another such that the storage container 2 can be inserted into the shelf structure 95 and can be pulled out of the shelf structure 95, in its longitudinal direction 17. The first handle 52 which is conceived as a front handle 52 can be used for this handling in the case of the first storage container 2*a* and the second handle 52*b* which is likewise conceived as a front handle 52 can be used in the case of the second storage container 2*b*.

The guide device 96 is expediently integrated as one piece into the housing lower part 24 which consists of plastic material.

Preferably, several storage containers 2 are stackable onto one another in the height direction 16, so that a container stack 98 which consists of at least two storage containers 2 which are stacked upon one another results, as is shown in FIG. 17 in the context of three stacked storage containers 2. In the stacked state, a respective upper container 2 is seated with its lower side 4 on the upper side 5 of a further container 2 which is arranged therebelow.

Expediently, each storage container 2 is the region of its lower side 4 has a lower coupling device 102 which is designed for example in a manner which is evident from FIGS. 3 and 8. Furthermore, each storage container 2 on the upper side 5 has an upper coupling device 103 whose preferred design is evident from FIGS. 1 and 7. The two coupling devices 102, 103 are adapted to one another such that on account of their interaction, the storage containers 2 which are directly stacked on one another can be releasably coupled to one another in a manner in which they cannot be lifted from one another. Such a coupled state is shown in FIG. 17. The container stack 98 can then be carried and transported as a unit by way of the upper carrier grip 45 of the uppermost storage container 2 which is pivoted into the position of use.

The locking means 38 which are explained further above preferably belong at least partly to the two coupling devices 102, 103. By way of example, the rotary bar 44 can be rotated into a coupling position which is shown in FIG. 17 at 100 and in which it couples the two storage containers 2 which are stacked onto one another, to one another in a non-liftable manner in the region of the front side 6.

Further constituents of the coupling devices 102, 103 with regard to the illustrated embodiment example are formed by projections which are formed on the lower side 4 and deepenings which are formed on the upper side 5. In the state of two storage containers 2 stacked onto one another, the projections and deepenings at least partly engage into one another, such that they overlap one another transversely to the height direction 16 and likewise effect a coupling of two storage containers 2 which are stacked onto one another, in a manner such that they cannot be lifted from one another, in particular in the region of the rear side 7. The projections expediently are stand feet which serve for placing the storage container 2 on a base.

The invention claimed is:

1. A storage device with several storage containers, amongst which at least one first storage container and at least one second storage container is located, wherein the at least one first storage container comprises a first container housing, on which a housing fastening interface is formed at the outside, to which housing fastening interface a first handle which is designed as a pivotable carrier grip, around which a hand can engage, is fastened by way of a first grip fastening interface which is formed on it, and wherein the at least one second storage container comprises a second container housing, on which a housing fastening interface is likewise formed at the outside, on which housing fastening interface a second handle is fastened by way of a second grip fastening interface which is formed on it, wherein the housing fastening interfaces of the first container housing and of the second container housing amongst one another are designed identically as a uniform housing fastening interface, wherein the second handle which is fastened to the uniform housing fastening interface of the second container housing is designed as a pull grip, around which one cannot grip, with a grip ledge, behind which the fingers of a hand can grip, and wherein the uniform housing fastening interface comprises at least one common housing fastening section and at least one individual housing fastening section which is distanced with respect to the at least one common housing fastening section, wherein the first handle which is designed as a pivotable carrier grip as well as the second handle which is designed as a pull grip is fastened to the at least one common housing fastening section of the assigned container housing and wherein only the second handle which is designed as a pull grip is yet additionally also fastened to the at least one individual housing fastening section of the second container housing, and wherein the first grip fastening interface of the first handle designed as a pivotable carrier grip as well as the second grip fastening interface of the second handle designed as a pull grip comprises at least one primary grip fastening section and only the second grip fastening interface of the second handle designed as a pull grip additionally comprises at least one secondary grip fastening section, wherein the first handle as well as the second handle via its respective at least one primary grip fastening section is fastened to the at least one common housing fastening section of the uniform housing fastening interface and wherein the second handle designed as a pull grip is yet additionally also fastened with its at least one secondary grip fastening section to the at least one individual housing fastening section of the uniform housing fastening interface.

2. The storage device according to claim 1, wherein the second handle which is fastened to the uniform housing interface of the second container housing is immovable with respect to the second container housing.

3. The storage device according to claim 1, wherein the first grip fastening interface of the first handle, said first handle being designed as a pivotable carrier grip, is designed differently from the second grip fastening interface of the second handle, said second handle being designed as a pull grip.

4. The storage device according to claim 1, wherein the uniform housing fastening interface of the second container housing is completely used by the second grip fastening interface of the second handle, said second handle being designed as a pull grip, whereas the uniform housing fastening interface of the first container housing is only partly used by the first grip fastening interface of the first handle, said first handle being designed as a pivotable carrier grip.

5. The storage device according to claim 1, wherein the uniform housing fastening interface comprises a plurality of housing fastening sections, wherein the second grip fastening interface of the second handle designed as a pull grip is in fastening engagement with all housing fastening sections of the uniform housing fastening interface of the second container housing, whilst the first grip fastening interface of the first handle designed as a pivotable carrier grip is only in fastening engagement with some of the housing fastening sections of the uniform housing fastening interface of the first container housing.

6. The storage device according to claim 1, wherein the uniform housing fastening interface comprises precisely two common housing fastening sections and precisely two individual housing fastening sections.

7. The storage device according to claim 6, wherein the two common housing fastening sections and the two individual housing fastening sections each lie in two adjacent corner regions of an imagined rectangle.

8. The storage device according to claim 1, wherein each common housing fastening section of the uniform housing fastening interface together with a primary grip fastening section of the first or second grip fastening interface of the first or second handle which is assigned to it forms a latching connection device, in a manner such that the first handle as well as the second handle are fixable or fixed to the at least one common housing fastening section of the uniform housing fastening interface by way of a latching connection procedure.

9. The storage device according to claim 8, wherein each individual housing fastening section of the uniform housing fastening interface together with a secondary grip fastening section of the second grip fastening interface of the second handle designed as a pull grip forms an insert-pivot connection device, in a manner such that the second handle designed as a pull grip for its assembly on the second container housing is insertable with its at least one secondary grip fastening section into the at least one individual housing fastening section and subsequently for forming a latching connection of the at least one latching connection device is pivotable relative to the second container housing and by way of its at least one primary grip fastening section is latchable into a common fastening section.

10. The storage device according to claim 1, wherein each common housing fastening section of the uniform housing fastening interface together with a primary grip fastening section of the first grip fastening interface of the first handle designed as a pivotable carrier grip forms a pivot bearing device for the first handle, in a manner such that the first handle is pivotable about a pivot axis which is defined by the pivot bearing device, between a position of non-use which is pivoted onto the container housing and a position of use which is pivoted away from the container housing.

11. The storage device according to claim 10, wherein each pivot bearing device comprises two bearing elements which engage into one another and which are rotatable relative to one another about the pivot axis, of which the one bearing element is formed by a common housing fastening section and the other bearing element by a primary grip fastening section of the first handle.

12. The storage device according to claim 11, wherein, of the two bearing elements of each pivot bearing device, the one is designed as a bearing eye and the other as a bearing pin which can be rotatably inserted into the bearing eye.

13. The storage device according to claim 10, wherein an arresting device for the releasable arresting of the position of non-use of the first handle is assigned to this first handle which is designed as a pivotable carrier grip.

14. The storage device according to claim 13, wherein the arresting device is designed in a manner such that given a manually created pivoting of the first handle it can automatically latch in and latch out with a snap effect.

15. The storage device according to claim 10, wherein the uniform housing fastening interface and the first grip fastening interface define two pivot bearing devices which are distanced to one another in the axis direction of the pivot axis.

16. The storage device according to claim 1, wherein the first handle which is designed as a pivotable carrier grip is a bow grip which is designed at least in an essentially U-shaped manner and which comprises two grip limbs which are connected to one another by a connection web, around which a hand can grip and on whose free end sections which are opposite the connection web in each case a constituent of the first grip fastening interface which is in fastening engagement with the uniform housing fastening interface is arranged.

17. The storage device according to claim 1, wherein the second handle which is designed as a pull grip is designed in an H-shaped manner and comprises two grip limbs which are parallel to one another and which are connected to one another by a connection web, wherein the grip ledge is formed by the connection web.

18. The storage device according to claim 1, wherein the first container housing as well as the second container housing have an upper side which faces in a height direction and a front side which is orientated at right angles to the height direction, wherein the uniform housing fastening interface is formed on this front side and the first handle and well as the second handle is arranged on the front side of the first and of the second container housing respectively as a front handle.

19. The storage device according to claim 18, wherein the first container housing of the at least one first storage container and/or the second container housing of the at least one second storage container additionally to the front handle which is arranged on the front side comprises an upper carrier grip which is arranged on the upper side.

20. The storage device according to claim 19, wherein the upper carrier grip is pivotably mounted on the assigned first and second container housing in a manner such that it is pivotable relative to the assigned first and second container housing respectively between a position of non-use which is pivoted onto the first and second container housing respectively and a position of use which is pivoted away from the first and second container housing respectively and which projects upwards.

21. The storage device according to claim 1, wherein the first container housing of the at least one first storage container and/or the second container housing of the at least one second storage container comprise a box-like housing lower part which on its upper side comprises an access opening to a storage space, wherein at least one first storage container and/or at least one second storage container comprises a housing lid which is assigned to the access opening and is pivotably mounted on the housing lower part for opening and closing the access opening, wherein the uniform housing fastening interface is arranged at the outside on a front wall of the housing lower part which projects upwards from a base wall of the housing lower part.

22. The storage device according to claim 1, wherein each first and second storage container on the outside of its first and second container housing respectively comprises a guide device, via which it can be received in a shelf structure in a manner in which it can be pulled out.

23. The storage device according to claim 1, wherein each first and second storage container on its container housing in the region of the lower side comprises a lower coupling device and in the region of the upper side comprises an upper coupling device, wherein these two coupling devices are adapted to one another in a manner such that storage containers which are directly stacked onto one another in the height direction, by way of the interaction of the upper coupling device of the respective lower storage container and of the lower coupling device of the respective upper storage container can be releasably coupled to one another in a manner in which they cannot be lifted from one another.

* * * * *